(12) United States Patent
Shen et al.

(10) Patent No.: US 10,069,646 B2
(45) Date of Patent: Sep. 4, 2018

(54) DISTRIBUTION OF TUNNEL ENDPOINT MAPPING INFORMATION

(71) Applicant: Nicira, Inc., Palo Alto, CA (US)

(72) Inventors: Jianjun Shen, Beijing (CN); Alexander Tessmer, Mountain View, CA (US); Mukesh Hira, Palo Alto, CA (US); Pankaj Thakkar, Cupertino, CA (US); Hua Wang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 293 days.

(21) Appl. No.: 14/956,756

(22) Filed: Dec. 2, 2015

(65) Prior Publication Data

US 2017/0163442 A1 Jun. 8, 2017

(51) Int. Cl.
*H04L 12/46* (2006.01)
*H04L 29/12* (2006.01)

(52) U.S. Cl.
CPC ...... *H04L 12/4633* (2013.01); *H04L 61/6022* (2013.01)

(58) Field of Classification Search
CPC ... H04L 12/4633; H04L 49/70; H04L 45/745; H04L 12/4641
See application file for complete search history.

(56) References Cited

U.S. PATENT DOCUMENTS

| | | | |
|---|---|---|---|
| 6,888,797 B1 | 5/2005 | Cao et al. | |
| 7,599,373 B1 * | 10/2009 | Kalmanek, Jr. | H04L 12/2881 370/392 |
| 9,282,019 B2 | 3/2016 | Ganichev et al. | |
| 9,331,946 B2 | 5/2016 | Okita | |
| 2002/0097724 A1 | 7/2002 | Halme et al. | |
| 2005/0207411 A1 | 9/2005 | Ota et al. | |
| 2008/0049752 A1 | 2/2008 | Grant | |

(Continued)

FOREIGN PATENT DOCUMENTS

| | | |
|---|---|---|
| EP | 2849395 A1 | 3/2015 |
| WO | 2017095564 A1 | 6/2017 |

OTHER PUBLICATIONS

Non-published commonly owned U.S. Appl. No. 14/956,716, filed Dec. 2, 2015, 65 pages, Nicira, Inc.

(Continued)

*Primary Examiner* — Jimmy H Tran
(74) *Attorney, Agent, or Firm* — Adeli LLP

(57) ABSTRACT

Some embodiments provide a method for a controller for mapping and sharing up to date configuration information for a logical network comprising managed forwarding elements having multiple tunnel endpoints. The method identifies a data compute node for operation on a host machine that includes a managed forwarding element (MFE) having multiple tunnel endpoints. The data compute node belongs to a particular logical network. The method identifies multiple other data compute nodes belonging to the particular logical network. The method distributes to the MFE (i) a mapping of each data compute node of the other data compute nodes to an identifier for a group of tunnel endpoints associated with the data compute node and (ii) a mapping of each of the identifiers to a list of tunnel endpoints. The MFE uses the mappings to encapsulate packets sent from the data compute node for transmission to other MFEs.

20 Claims, 20 Drawing Sheets

(56) References Cited

U.S. PATENT DOCUMENTS

| | | | |
|---|---|---|---|
| 2008/0069114 A1 | 3/2008 | Shimada | |
| 2009/0303880 A1* | 12/2009 | Maltz | H04L 45/02 370/235 |
| 2009/0307334 A1* | 12/2009 | Maltz | H04L 29/12028 709/219 |
| 2010/0322148 A1* | 12/2010 | Liu | H04B 7/15557 370/315 |
| 2011/0087799 A1* | 4/2011 | Padhye | H04L 12/6418 709/235 |
| 2011/0216769 A1 | 9/2011 | Lakshmanan et al. | |
| 2011/0225303 A1 | 9/2011 | Engebretson | |
| 2011/0299534 A1 | 12/2011 | Koganti et al. | |
| 2012/0044837 A1 | 2/2012 | Ibanez Fernández et al. | |
| 2012/0134266 A1 | 5/2012 | Roitshtein et al. | |
| 2012/0236761 A1* | 9/2012 | Yang | H04L 61/103 370/259 |
| 2013/0058350 A1 | 3/2013 | Fulton | |
| 2013/0125124 A1* | 5/2013 | Kempf | G06F 9/45533 718/1 |
| 2013/0148543 A1* | 6/2013 | Koponen | H04L 47/12 370/254 |
| 2013/0322457 A1 | 12/2013 | Budhia et al. | |
| 2014/0059111 A1 | 2/2014 | Veeraiyan | |
| 2014/0086253 A1* | 3/2014 | Yong | H04L 12/4633 370/395.53 |
| 2014/0192804 A1 | 7/2014 | Ghanwani et al. | |
| 2014/0247753 A1 | 9/2014 | Koponen et al. | |
| 2014/0269702 A1* | 9/2014 | Moreno | H04L 45/64 370/390 |
| 2015/0009995 A1 | 1/2015 | Gross, IV et al. | |
| 2015/0010001 A1 | 1/2015 | Duda et al. | |
| 2015/0063364 A1* | 3/2015 | Thakkar | H04L 12/66 370/401 |
| 2015/0098465 A1 | 4/2015 | Caputo, II et al. | |
| 2015/0103673 A1 | 4/2015 | Shimada et al. | |
| 2015/0117454 A1 | 4/2015 | Koponen et al. | |
| 2015/0124828 A1 | 5/2015 | Cj et al. | |
| 2015/0131618 A1* | 5/2015 | Chen | H04W 16/02 370/332 |
| 2015/0180769 A1 | 6/2015 | Wang et al. | |
| 2015/0253829 A1* | 9/2015 | Palmer | G06F 1/28 713/300 |
| 2015/0312144 A1 | 10/2015 | Gobriel et al. | |
| 2016/0011925 A1* | 1/2016 | Kulkarni | H04L 43/0817 714/57 |
| 2016/0065385 A1* | 3/2016 | Hwang | H04L 47/12 370/392 |
| 2016/0134531 A1* | 5/2016 | Assarpour | H04L 45/74 370/392 |
| 2016/0218975 A1 | 7/2016 | Hyoudou et al. | |
| 2016/0226755 A1 | 8/2016 | Hammam et al. | |
| 2016/0234091 A1 | 8/2016 | Emmadi et al. | |
| 2016/0241474 A1 | 8/2016 | Wang et al. | |
| 2016/0278140 A1 | 9/2016 | Sung et al. | |
| 2016/0308727 A1 | 10/2016 | Rojas Sánchez et al. | |
| 2017/0086191 A1* | 3/2017 | Sipra | H04L 41/0893 |
| 2017/0093618 A1 | 3/2017 | Chanda et al. | |
| 2017/0163536 A1 | 6/2017 | Shen et al. | |
| 2017/0163598 A1 | 6/2017 | Shen et al. | |
| 2017/0163599 A1 | 6/2017 | Shen et al. | |

OTHER PUBLICATIONS

Non-published commonly owned U.S. Appl. No. 14/956,736, filed Dec. 2, 2015, 65 pages, Nicira, Inc.

Non-published commonly owned U.S. Appl. No. 14/956,775, filed Dec. 2, 2015, 64 pages, Nicira, Inc.

Non-published commonly owned International Patent Application PCT/US2016/059614, filed Oct. 29, 2016, 65 pages, Nicira, Inc.

International Search Report and Written Opinion of PCT/US2016/059614, dated Feb. 6, 2017, 11 pages, International Searching Authority.

* cited by examiner

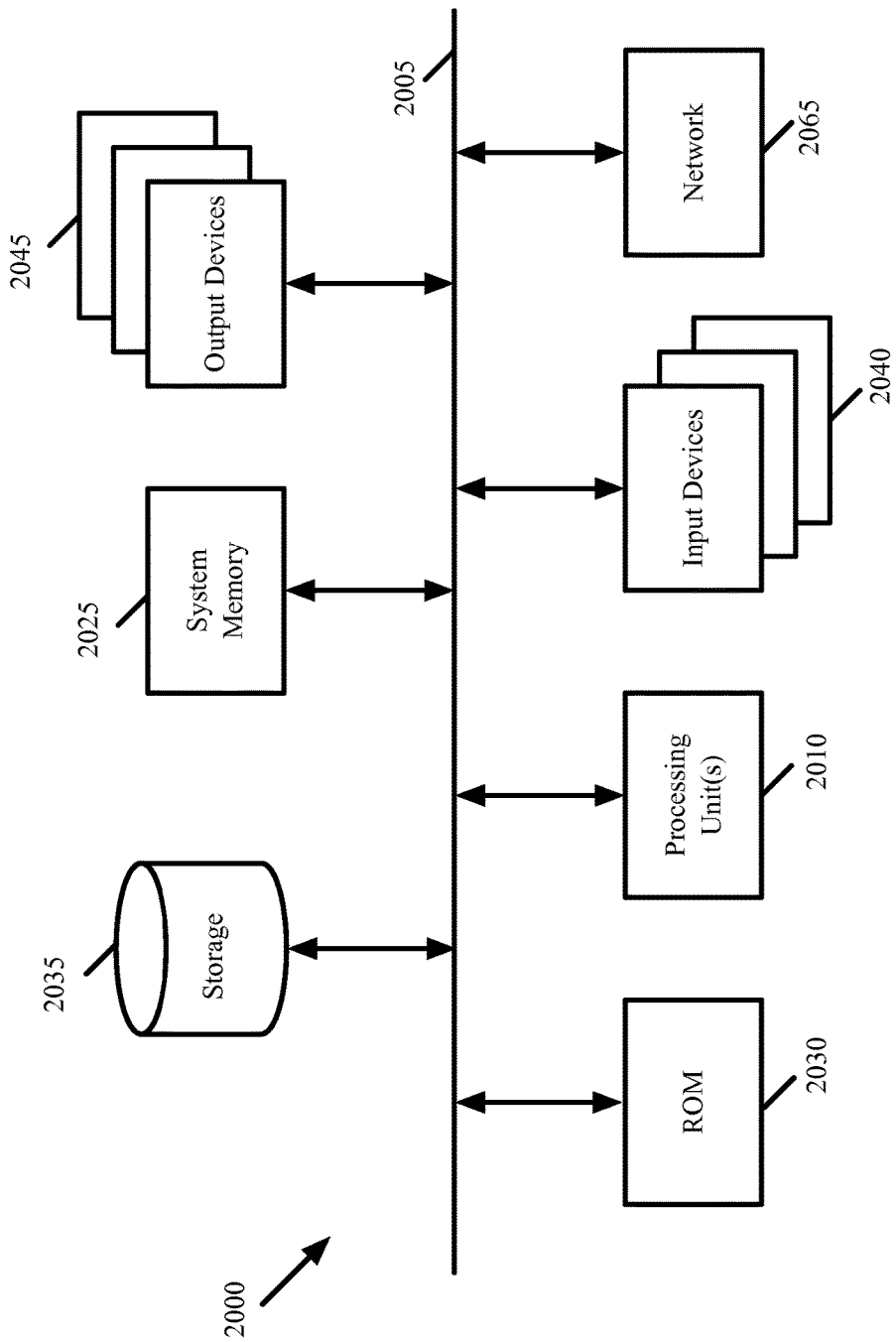

DISTRIBUTION OF TUNNEL ENDPOINT MAPPING INFORMATION

BACKGROUND

Within a data center, overlay networks are often used for communication between virtual machines, servers, etc. that belong to the same logical network. To implement these overlays, MAC over IP tunnels are usually created between the forwarding elements (e.g., virtual switches, top of rack (TOR) switches, etc.) in the data center. When these forwarding elements each have a single network interface, they are each assigned a single tunnel endpoint IP address, and the encapsulation of packets between two forwarding elements uses the tunnel endpoint IP addresses of the two forwarding elements.

However, increasingly, the forwarding elements may have multiple such tunnel endpoint addresses (e.g., to leverage multiple physical interfaces or L2/L3 links). Thus, a controller managing these forwarding elements as well as the forwarding elements themselves should have a scheme for handling multiple tunnel endpoint addresses per forwarding element.

BRIEF SUMMARY

Some embodiments provide a method for encapsulating packets in a tunnel at a source managed forwarding element (MFE) for communication to a destination managed forwarding element. The source MFE receives a data packet (e.g., from a local data compute node) and identifies that the packet requires transmission via an overlay network to the destination MFE (e.g., based on one or more destination addresses of the packet, such as MAC and/or IP addresses). The source MFE identifies both source and destination tunnel endpoints for tunneling the packet to the destination MFE, which may involve selecting between more than one possible tunnel endpoint for the source and/or destination MFE.

For instance, if the source MFE has multiple tunnel endpoints that may be used for data packets from the source address, the source MFE of some embodiments performs a load balancing technique to select one of the source tunnel endpoints. For example, different embodiments may use a hash of the source MAC and/or IP address, a hash of the standard connection 5-tuple (source and destination IP addresses, source and destination transport layer ports, and transport protocol), or a mechanism that assesses the current load on the different tunnel endpoints (e.g., the fullness of the queues, etc.), to select a source tunnel endpoint.

In addition, if the destination MFE has multiple tunnel endpoints that may be used, the source MFE uses a similar mechanism (e.g., using a hash of the destination MAC address or the connection 5-tuple) to select a destination tunnel endpoint. With both the source and destination tunnel endpoints selected, the MFE can encapsulate the packet and transmit the packet onto the physical network between the two endpoints.

To perform this selection, in some embodiments each MFE stores a mapping of data compute node addresses to tunnel endpoint group labels (for both the local data compute nodes that connect directly to the MFE as well as the addresses that are on the same logical networks as the local data compute nodes) and a mapping of tunnel endpoint group labels to lists of tunnel endpoints. In some embodiments, this mapping information may be distributed to the MFEs via a network control system that collects and stores these mappings in tables.

Using this technique, packets between two data compute nodes could be sent out of one tunnel endpoint on a MFE but received at a different tunnel endpoint of the MFE. However, to ensure that packets for a particular data compute node (or a particular flow) are both sent and received through the same tunnel endpoint, the MFEs of some embodiments learn the mappings of data compute node addresses to specific tunnel endpoints. To allow for each MFE to load balance its own traffic, when a first MFE sends an initial packet between one of its local data compute nodes and a remote data compute node to a second MFE, the first MFE stores its selected source tunnel endpoint as the tunnel endpoint for the address of its local data compute node.

However, the first MFE does not store its selection of a destination tunnel endpoint for the remote data compute address, because doing so would allow the first MFE to be performing the load balancing for the second MFE. Instead, when the second MFE receives the initial packet, it also stores the source tunnel endpoint selected by the first MFE as mapping to the source data compute node address. When its local data compute node sends a reply packet, the second MFE performs its own load balancing to select its source tunnel endpoint, which may be different than the tunnel endpoint on which the initial packet was received. The second MFE then stores this mapping between its local data compute node and the selected tunnel endpoint. For the destination tunnel endpoint of this reply packet, the second MFE uses the mapping that it determined from the initial packet. When the first MFE receives the reply packet, it stores the mapping between the source tunnel endpoint and the remote data compute node. At this point, an equilibrium is reached, with both MFEs sending packets between the same pair of tunnel endpoints.

In addition to sending packets through tunnels to MFEs with multiple tunnel endpoints in order to reach a remote data compute node, in some cases a MFE receives a packet from one of its local data compute nodes that needs to be bridged to another remote network (e.g., another logical network, a VLAN, etc.). Some embodiments use bridge clusters for performing this bridging, which may include multiple MFEs (some or all of which may have multiple tunnel endpoints). All of the tunnel endpoints associated with a bridge cluster may be grouped, and the source MFE performs a similar selection process (e.g., hashing the destination address or connection 5-tuple) to select a tunnel endpoint in the bridge cluster group to which to send the packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 20 conceptually illustrates an electronic system with which some embodiments of the invention are implemented.

DETAILED DESCRIPTION

Figure 1:
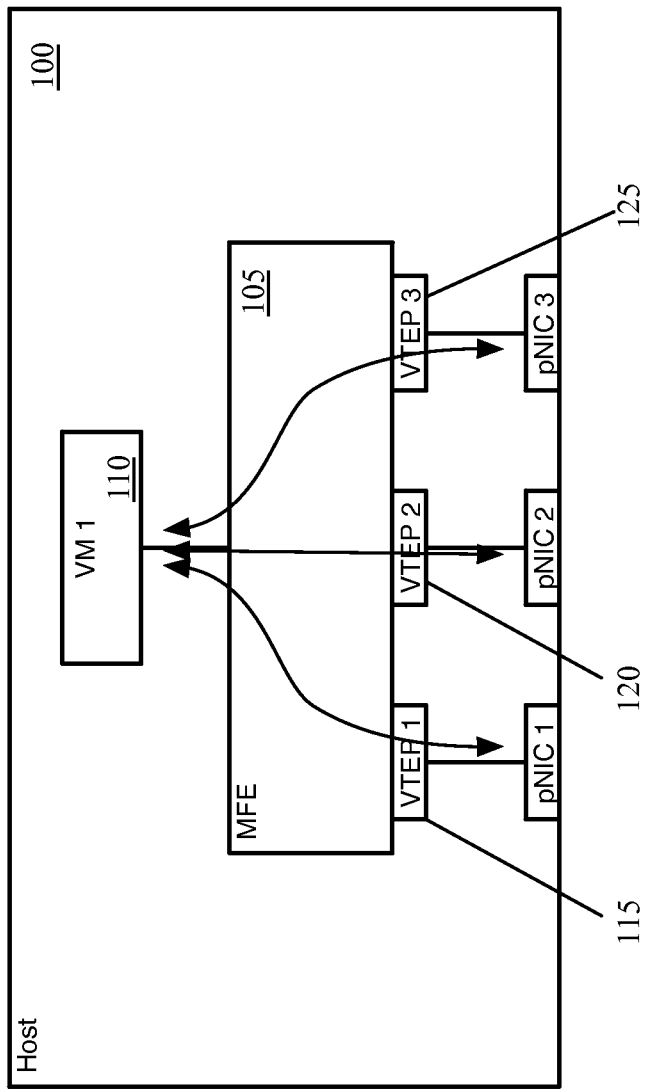
FIG. 1 conceptually illustrates a host machine of some embodiments that includes a MFE having multiple tunnel endpoints.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for encapsulating packets in a tunnel at a source managed forwarding element (MFE) for communication to a destination managed forwarding element. The source MFE receives a data packet (e.g., from a local data compute node) and identifies that the packet requires transmission via an overlay network to the destination MFE (e.g., based on one or more destination addresses of the packet, such as MAC and/or IP addresses). The source MFE identifies both source and destination tunnel endpoints for tunneling the packet to the destination MFE, which may involve selecting between more than one possible tunnel endpoint for the source and/or destination MFE.

For instance, if the source MFE has multiple tunnel endpoints that may be used for data packets from the source address, the source MFE of some embodiments performs a load balancing technique to select one of the source tunnel endpoints. For example, different embodiments may use a hash of the source MAC and/or IP address, a hash of the standard connection 5-tuple (source and destination IP addresses, source and destination transport layer ports, and transport protocol), or a mechanism that assesses the current load on the different tunnel endpoints (e.g., the fullness of the queues, etc.), to select a source tunnel endpoint.

In addition, if the destination MFE has multiple tunnel endpoints that may be used, the source MFE uses a similar mechanism (e.g., using a hash of the destination MAC address or the connection 5-tuple) to select a destination tunnel endpoint. With both the source and destination tunnel endpoints selected, the MFE can encapsulate the packet and transmit the packet onto the physical network between the two endpoints.

To perform this selection, in some embodiments each MFE stores a mapping of data compute node addresses to tunnel endpoint group labels (for both the local data compute nodes that connect directly to the MFE as well as the addresses that are on the same logical networks as the local data compute nodes) and a mapping of tunnel endpoint group labels to lists of tunnel endpoints. In some embodiments, this mapping information may be distributed to the MFEs via a network control system that collects and stores these mappings in tables.

Using this technique, packets between two data compute nodes could be sent out of one tunnel endpoint on a MFE but received at a different tunnel endpoint of the MFE. However, to ensure that packets for a particular data compute node (or a particular flow) are both sent and received through the same tunnel endpoint, the MFEs of some embodiments learn the mappings of data compute node addresses to specific tunnel endpoints. To allow for each MFE to load balance its own traffic, when a first MFE sends an initial packet between one of its local data compute nodes and a remote data compute node to a second MFE, the first MFE stores its selected source tunnel endpoint as the tunnel endpoint for the address of its local data compute node.

However, the first MFE does not store its selection of a destination tunnel endpoint for the remote data compute address, because doing so would allow the first MFE to be performing the load balancing for the second MFE. Instead, when the second MFE receives the initial packet, it also stores the source tunnel endpoint selected by the first MFE as mapping to the source data compute node address. When its local data compute node sends a reply packet, the second MFE performs its own load balancing to select its source tunnel endpoint, which may be different than the tunnel endpoint on which the initial packet was received. The second MFE then stores this mapping between its local data compute node and the selected tunnel endpoint. For the destination tunnel endpoint of this reply packet, the second MFE uses the mapping that it determined from the initial packet. When the first MFE receives the reply packet, it stores the mapping between the source tunnel endpoint and the remote data compute node. At this point, an equilibrium is reached, with both MFEs sending packets between the same pair of tunnel endpoints.

In addition to sending packets through tunnels to MFEs with multiple tunnel endpoints in order to reach a remote data compute node, in some cases a MFE receives a packet from one of its local data compute nodes that needs to be bridged to another remote network (e.g., another logical network, a VLAN, etc.). Some embodiments use bridge clusters for performing this bridging, which may include multiple MFEs (some or all of which may have multiple tunnel endpoints). All of the tunnel endpoints associated with a bridge cluster may be grouped, and the source MFE performs a similar selection process (e.g., hashing the destination address or connection 5-tuple) to select a tunnel endpoint in the bridge cluster group to which to send the packet.

The above introduces the concept of managed forwarding elements selecting between multiple tunnel endpoints for a specific address. In the following, Section I focuses on the communication between MFEs that have multiple tunnel endpoints, while Section II describes the example of bridge clusters with multiple MFEs having multiple tunnel endpoints. Section III then describes the configuration of the MFEs through a network control system. Finally, Section IV describes the electronic system with which some embodiments of the invention are implemented.

I. MFEs with Multiple Tunnel Endpoints

As mentioned, some embodiments provide techniques for selecting source and destination tunnel endpoints for managed forwarding elements (MFEs) that have more than one tunnel endpoint. FIG. 1 conceptually illustrates a host machine 100 of some embodiments that includes a MFE 105 having multiple tunnel endpoints. In this example, the host 100 may be one of many host machines in a datacenter, such as an enterprise datacenter, a multi-tenant datacenter, etc. In this example, the figure illustrates a virtual machine (VM) 110, but it should be understood that a typical host machine will host many (e.g., dozens, hundreds, etc.) of data compute nodes, such as VMs, containers, etc. The VM 110, in some embodiments, belongs to a logical network implemented within the datacenter (or across multiple datacenters), and the MFEs in the datacenter use overlay networks for communications for different logical network. These overlay networks use addresses of the tunnel endpoints to send packets across the intervening physical network, with the encapsulation also including a logical network identifier (LNI). The LNI indicate to which overlay network (e.g., which logical network or logical forwarding element) a packet belongs, and allow the receiving MFE to properly process a packet according to the logical network specified by the LNI.

The MFE 105 has three virtual tunnel endpoints (VTEPs) 115-125, which effectively act as outward-facing ports of the MFE. The MFE 105, in some embodiments, is a software forwarding element implemented in the virtualization software of the host 100 (e.g., a virtual switch such as Open vSwitch, ESX, etc.). In some embodiments, the VTEP is part of the virtual switch while in other embodiments the VTEP is a separate software entity, but can be thought of as an extension of the virtual switch (e.g., part of an I/O chain between the virtual switch and the physical network interface through which the host connects to the physical network of the datacenter). In either case, the VTEPs will be referred to herein as part of the MFE, with the MFE performing the selection of source and destination VTEPs.

The three VTEPs 115-125 correspond to three separate physical network interface controllers (pNICs), which are the physical interfaces of the host machine 100 that connect to the physical network of the datacenter. Packets sent from the VM 110 are output through these pNICs onto this physical network and packets sent to the VM 110 are received through these pNICs. However, in other embodiments, the tunnel endpoints may not have a 1:1 correlation to physical interfaces (e.g., associating multiple VTEPs with a single pNIC).

As shown in FIG. 1, a packet sent from the VM 110 will be received by the MFE 105 (e.g., through a virtual port of the MFE 105 to which the VM 110 connects), and may be sent out of the MFE via any of the VTEPs 115-125. As described in more detail below, the MFE may use various criteria to determine which of the three VTEPs 115-125 to use as the source VTEP for encapsulating such a packet before sending the packet onto the physical network, such as hashing of different packet characteristics or assessment of the current load of the different VTEPs (e.g., looking at packet buffers or queues). Similarly, packets for the VM 110 may be received through any of VTEPs 115-125, based on various possible criteria used by the source of such packets. In this case, the MFE decapsulates the packet, identifies from the LNI that the packet belongs to the logical network to which the VM 110 attaches, and delivers the packet to the VM according to the forwarding table for the logical network.

Figure 2:
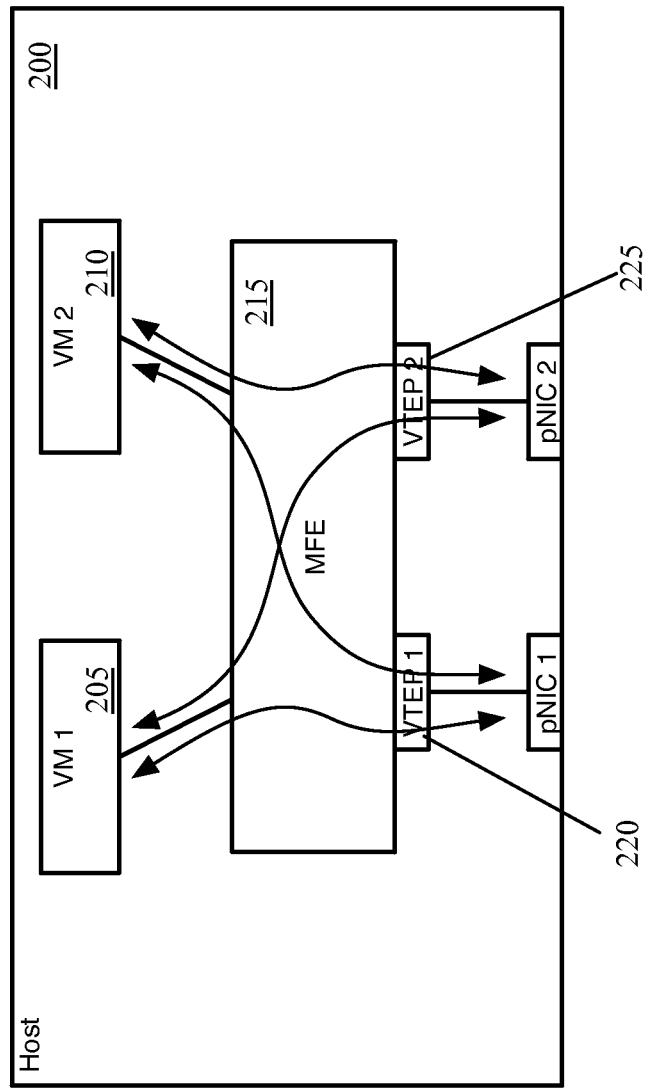
FIG. 2 conceptually illustrates a host machine of some embodiments that hosts two VMs that are connected to a MFE that operates on the host machine, and which has two VTEPs.

As mentioned, the host machines of some embodiments will typically host multiple data compute nodes, such as multiple virtual machines, multiple containers, or a combination thereof. These data compute nodes may share the use of multiple tunnel endpoints in some embodiments. FIG. 2 conceptually illustrates a host machine 200 that hosts two VMs 205 and 210. These VMs 205 and 210 are connected to a MFE 215 that operates on the host machine 200, and which has two VTEPs 220 and 225. In this case, as shown in the figure, traffic for VM1 205 may ingress and egress through either of the two VTEPs 220 and 225, and traffic for VM2 210 may also ingress and egress through either of these two VTEPs 220 and 225.

Under different load balancing techniques, the usage of the two VTEPs 220 and 225 for packets by the two VMs 205 and 210 would be different. For example, if the MFE assigns each VM to a VTEP based on a hash of its MAC address, then either both VMs 205 and 210 will share a single VTEP or they will each use one of the two VTEPs. On the other hand, if the assignment is flow-based (e.g., based on a hash of the connection 5-tuple), then most likely each of the VMs will have their traffic split between the VTEPs. Similarly, when the MFE 215 assesses the load on the VTEPs and assigns flows to the different VTEPs based on this load, the traffic for each of the VMs will likely be split in one way or another between the two VTEPs 220 and 225. In addition, the traffic distribution between the two VMs and the two VTEPs may change over time.

In some cases, however, not all of the tunnel endpoints are available to all of the data compute nodes on a host. In some cases, a host with several tunnel endpoints may belong to more than one designated zone of the physical datacenter network, with some of its tunnel endpoints connected to a first MFE on the host and other tunnel endpoints connected to a second MFE on the host, and those two (or more) MFEs assigned to different zones. In this case, data compute nodes may each connect to a specific MFE that is assigned to a zone to which the logical network of the data compute node belongs.

A. Communication Between MFEs

While the previous examples illustrate a single host machine with a single MFE that has multiple tunnel endpoints, in practice packets sent via the overlay networks have both source and destination tunnel endpoints. In some cases, both the source and destination MFEs (i.e., the MFE connected to the packet source, which acts as a first-hop MFE for processing the packet, and the MFE to which that first-hop MFE tunnels the packet) for a particular packet have multiple tunnel endpoints, in which case the source MFE needs to select one of its own tunnel endpoints as well as one of the possible destination tunnel endpoints.

As mentioned, the source MFE of some embodiments performs a load balancing technique to select one of the source tunnel endpoints. For example, different embodiments may use a hash of the source MAC and/or IP address, a hash of the standard connection 5-tuple, or a mechanism that assesses the current load on the different tunnel endpoints (e.g., the fullness of the queues, etc.), to select a source tunnel endpoint. In addition, if the destination MFE has multiple tunnel endpoints that may be used, the source MFE uses a similar mechanism (e.g., calculating a hash value of certain packet characteristics) to select a destination tunnel endpoint. With both the source and destination tunnel endpoints selected, the MFE can encapsulate the packet and transmit the packet onto the physical network between the two endpoints.

To perform this selection, in some embodiments each MFE stores a mapping of data compute node addresses to tunnel endpoint group labels for both the local data compute nodes that connect directly to the MFE as well as the addresses that are on the same logical networks as the local data compute nodes, as well as a mapping of tunnel endpoint group labels to lists of tunnel endpoints.

To ensure that packets for a particular data compute node (or a particular flow) are both sent and received through the same tunnel endpoint, the MFEs of some embodiments learn the mappings of data compute node addresses to specific tunnel endpoints. To allow for each MFE to load balance its own traffic, when a first MFE sends an initial packet between one of its local data compute nodes and a remote data compute node to a second MFE, the first MFE stores its selected source tunnel endpoint as the tunnel endpoint for the address of its local data compute node.

However, the first MFE does not store its selection of a destination tunnel endpoint for the remote data compute address. Instead, when the second MFE receives the initial packet, that second MFE also stores the source tunnel endpoint selected by the first MFE as mapping to the source data compute node address. When its local data compute node sends a reply packet, the second MFE performs its own load balancing to select its source tunnel endpoint, which may be different than the tunnel endpoint on which the initial packet was received. The second MFE then stores this mapping between its local data compute node and the selected tunnel endpoint. For the destination tunnel endpoint of this reply packet, the second MFE uses the mapping that it determined from the initial packet. When the first MFE receives the reply packet, it stores the mapping between the source tunnel endpoint and the remote data compute node. At this point, an equilibrium is reached, with both MFEs sending packets between the same pair of tunnel endpoints.

Figure 3:
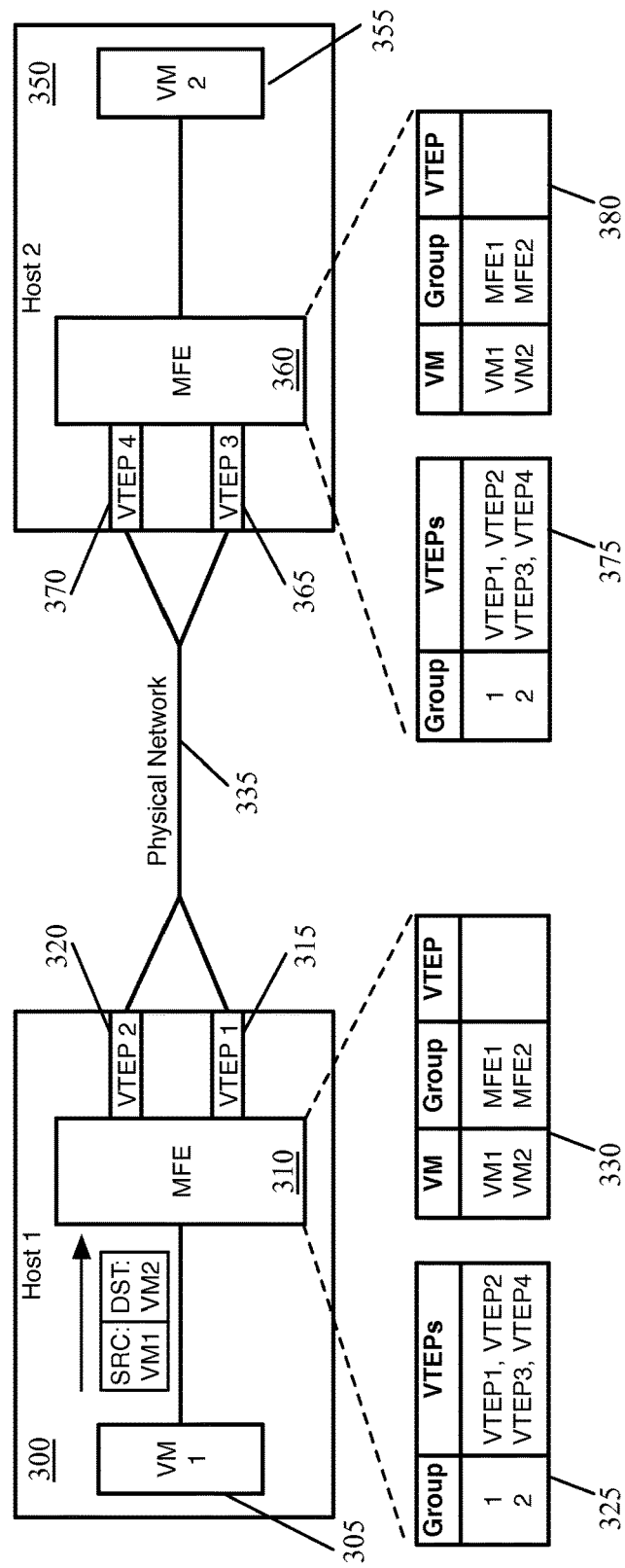
FIG. 3 conceptually illustrates a pair of host machines that are connected through a physical network (e.g., the physical network of a datacenter).

FIG. 3 conceptually illustrates a pair of host machines 300 and 350 that are connected through a physical network 335 (e.g., the physical network of a datacenter). The host machine 300 includes a VM 305 (most likely in addition to several other data compute nodes) that connects to a MFE 310 also operating on the host machine 300. The MFE 310 has two VTEPs 315 and 320. Similarly, the second host machine 350 includes a VM 355 that connects to a MFE 360 also operating on the host machine 350. This MFE 360 has two VTEPs 365 and 370.

In addition, each MFE stores various tables used for forwarding packets and performing various other packet processing operations, including selection of VTEPs. In this case, the figures illustrates that the first MFE 310 stores a first table 325 that maps VTEP groups to lists of VTEPs and a second table 330 that maps data compute node addresses (VMs, in this case) to VTEP groups and individual VTEPs within those groups. The first table 325 shows a first group corresponding to the MFE 310 (having VTEP1 and VTEP2) and a second group corresponding to the MFE 360 (having VTEP3 and VTEP4). The second table 330 shows the two VMs 305 and 310 mapped to VTEP groups for their respective MFEs 310 and 360. In some embodiments, these tables are populated by information passed from a central controller (and installed on the MFE by a local controller), as shown in greater detail below in Section III. The tables 375 and 380 of the second MFE 360 contain the same information at this time.

This physical network 335 may include various switches and routers that forward packets between the two host machines. However, these forwarding elements in the physical network do not process the inner (logical network) packets, instead only performing switching and/or routing according to the outer headers. That is, these various physical switches and routers are responsible for transporting the packet between the tunnel endpoints according to the tunnel endpoint addresses added by the source MFE. It should be understood that a typical datacenter network will include many more hosts, with each host having numerous data compute nodes. As such, the tables stored by the MFEs at each host will be more complicated, and may not be identical (e.g., some records on a first MFE may not be needed on a second MFE).

Figure 4:
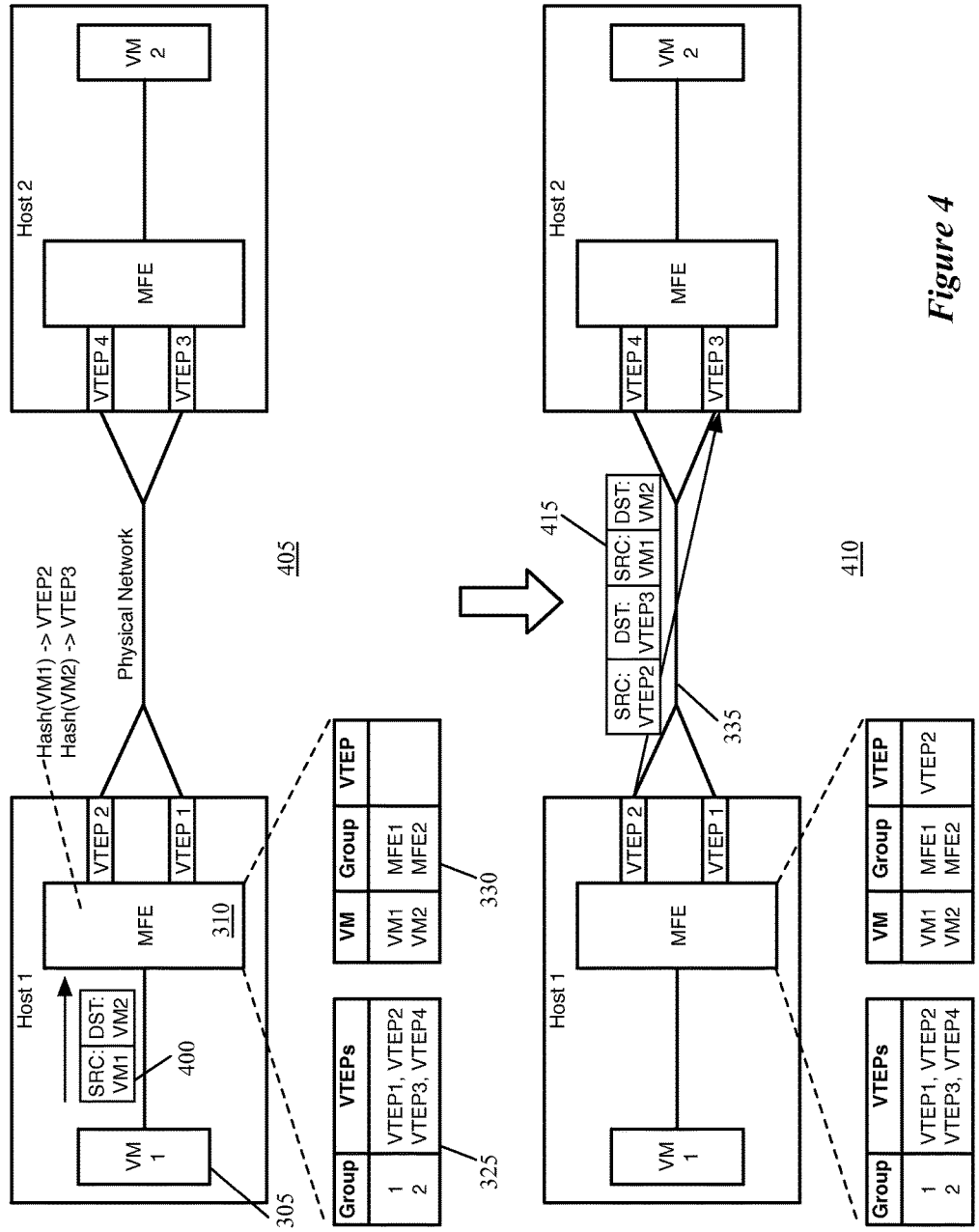
FIGS. 4-8 illustrate the processing of packets between two VMs by the MFEs to which the VMs connect, and the learning of tunnel endpoint mappings by these MFEs.

The following FIGS. 4-8 illustrate the processing of packets between the VMs 305 and 355 by the MFEs 310 and 360, and the learning of tunnel endpoint mappings by these MFEs. FIG. 4 illustrates a first packet 400 being sent from the VM 305 on the first host machine 300 over two stages 405 and 410. As used in this document, a packet refers to a collection of bits in a particular format sent across a network. It should be understood that the term packet may be used herein to refer to various formatted collections of bits that may be sent across a network, such as Ethernet frames, IP packets, TCP segments, UDP datagrams, etc. While the examples below refer to packets, it should be understood that the invention should not be limited to any specific format or type of data message.

This packet 400 has a source address of VM1 and a destination address of VM2. In this case, the source and destination addresses are layer 2 (MAC) addresses. It should be understood that a typical packet would also include source and destination IP addresses, though those are not shown here. In fact, if the two VMs 305 and 355 were connected to different logical switches (e.g., that each connect to a same logical router), then the destination MAC address as sent by the VM 305 would not be that of VM 355, but that of a logical router port. Once the MFE 310 finished its logical network processing, it would have performed MAC address replacement (and possibly address resolution protocol (ARP)) as part of the logical routing processing, and thus the pre-encapsulation packet would have the source MAC address of the logical router and destination MAC address as shown here in the figure.

The MFE 310 receives this packet, performs various processing, and identifies the source and destination VTEP groups required for encapsulation using the table 330. Specifically, based on the source MAC address VM1, the MFE 310 identifies that the source VTEP group is MFE1, and based on the destination MAC address VM2, that the destination VTEP group is MFE2. The table 325 indicates the list of possible VTEPs for each of these groups.

In this example, the MFEs 310 and 360 perform the load balancing over tunnel endpoints by assigning specific MAC addresses to specific VTEPs, as opposed to flow-based load balancing. Thus, as shown in stage 405, the MFE calculates a hash of the source MAC address VM1. The MFE calculates a hash value (H) and then performs the calculation of H modulo N, where N is the number of VTEPs in the group, to arrive at a value that corresponds to one of the VTEPs. Other embodiments may use similar algorithms that are resilient to the one of the VTEPs going down without the rearranging of traffic being sent through all of the otherwise unaffected VTEPs. As a result, the hash of MAC address VM1 provides VTEP2 320 as a source tunnel endpoint and the hash of MAC address VM2 provides VTEP3 365 as a destination tunnel endpoint for the packet 400.

In the second stage 410, the MFE has encapsulated the packet 400 and sent the encapsulated packet 415 onto the physical network 335. The encapsulated packet 415 includes outer headers with source and destination addresses of the interfaces VTEP2 (as the source) and VTEP3 (as the destination). It should be understood that, in some embodiments, both L2 and L3 headers are added as part of the encapsulation, with source and destination MAC and IP addresses included. Thus, both for the source VTEP2, both its IP address and MAC address are used, and for the destination VTEP3 at least its IP address is used in the outer headers. For the destination MAC address, the MAC address of a next hop physical router will be used, unless VTEP2 and VTEP3 connect to the same switch in the physical network. For the purposes of tunneling, however, the outer IP addresses are those of the selected tunnel endpoints.

In addition, the MFE 310 stores its selection of a source tunnel endpoint for packets with the source MAC address VM1. In some embodiments, rather than perform the hash calculation for every packet, the MFE stores its selection in its table mapping addresses to tunnel endpoints, so that future tunnel endpoint selections are made by reference to the table. However, no information is stored for the destination MAC address VM2. This is because the MFE 310 allows the MFE 360 to make its own decision as to which of its own tunnel endpoints to use for the address VM2, so that the MFE 360 can account for any of its own load balancing concerns.

Figure 5:
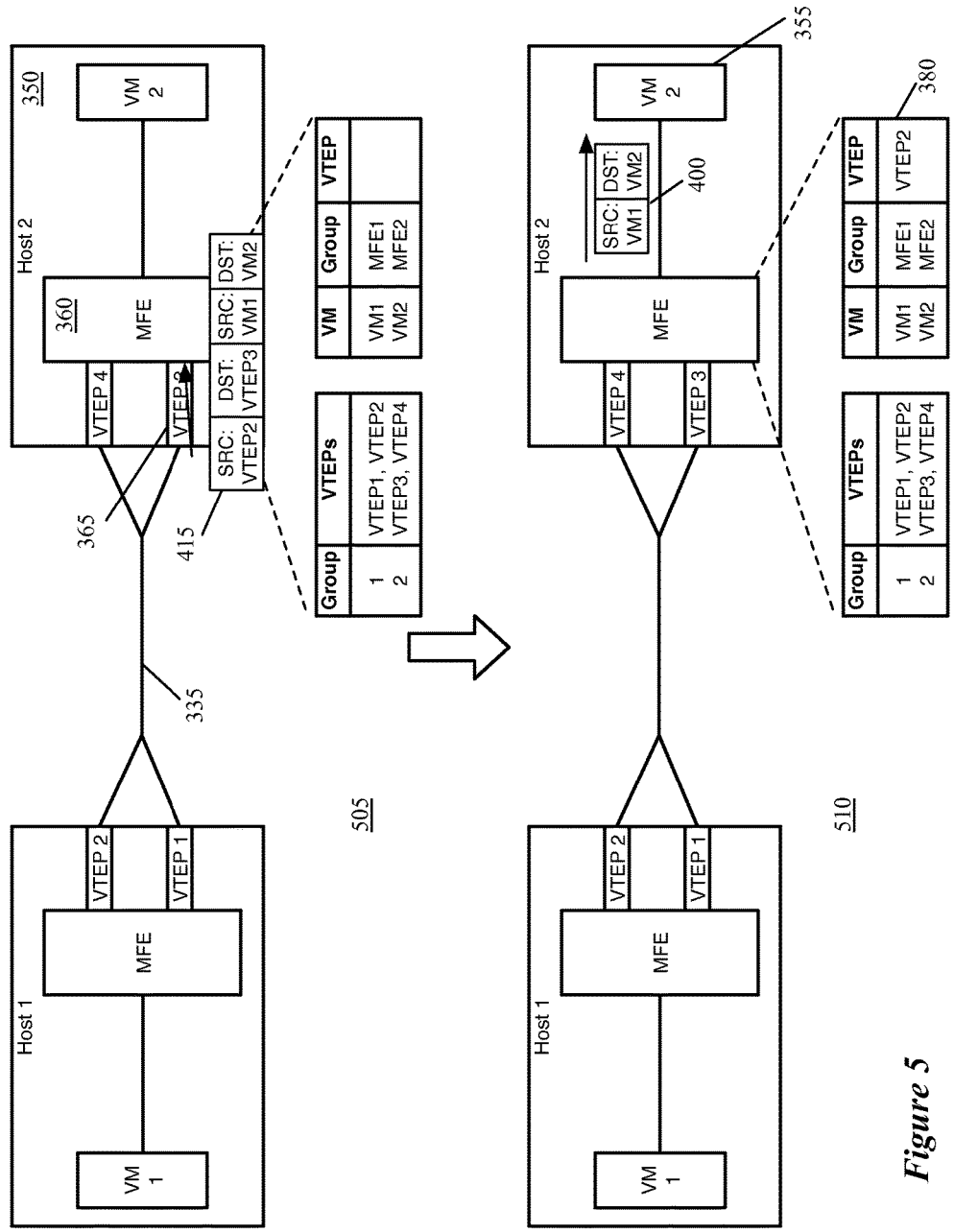

FIG. 5 illustrates the receipt of this first encapsulated packet 415 by the MFE 360 over two stages 505 and 510. As shown in the first stage 505, the MFE 360 receives the encapsulated packet 415 through VTEP3 365, as the physical switches/routers of the network 335 have forwarded the packet to the interface of the host machine 350 corresponding to this VTEP. At this point, the packet still includes the tunnel endpoint IP addresses for VTEP2 and VTEP3.

In the second stage 510, the MFE 360 has decapsulated the packet 415 and performed any additional processing so as to deliver the inner logical packet 400 to the VM 355. In some embodiments, the MFE 360 examines logical network information stored in the encapsulated packet (e.g., within the tunnel headers) and/or the destination MAC address VM2 in order to deliver the packet 400 to the VM 355.

The MFE 360 also stores information about the source tunnel endpoint in its address:group:VTEP mapping table 380. As shown, the same information stored by the first MFE 310 for the address VM1 is stored by the MFE 360—namely, that the MAC address VM1 maps to the tunnel endpoint VTEP2. By storing this information, the MFE will be able to use the mapping when sending future packets to the VM 305, either sent from VM 355 or from other data compute nodes operating on the host 350 (as in this case, the mapping is based on the MAC address, rather than the transport layer connection 5-tuple). However, at this point, the MFE 360 does not store any information regarding the mapping of the VM2 address to a tunnel endpoint.

Figure 6:
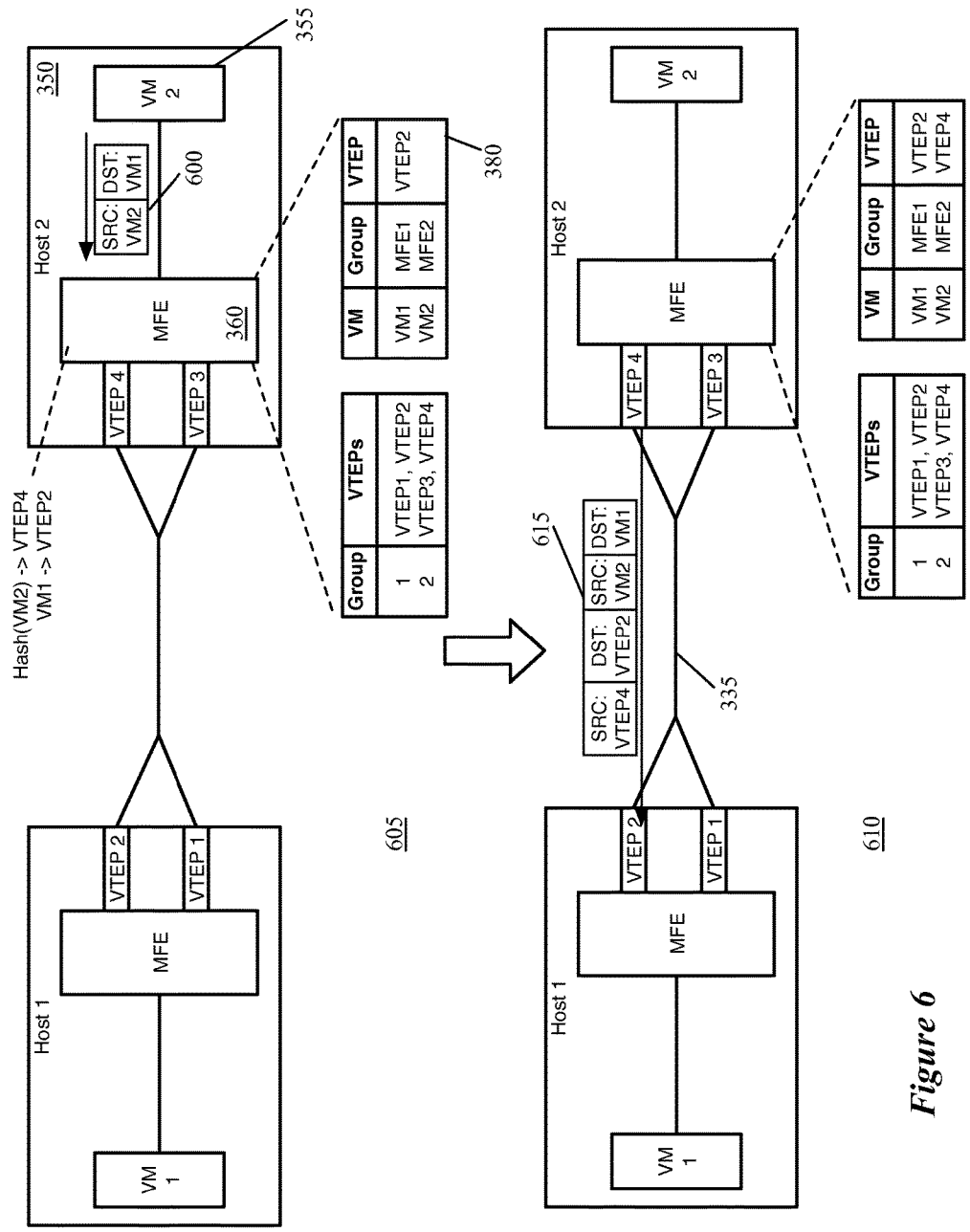

FIG. 6 illustrates the sending of a first return packet 600 from the VM 355 on the second host machine 350, over two stages 605 and 610. This packet has a source address of VM2 and a destination address of VM1. As described above, the VM 355 may not send out a packet with a destination MAC address of VM1, if the two VMs are not on the same logical switch, but once the MFE has performed its first-hop logical network processing (and prior to the encapsulation of the packet 400), the destination MAC address will have been modified to that of VM2.

The MFE 360 receives this packet, performs its various processing operations (e.g., logical network processing, etc.), and identifies the source and destination VTEPs for encapsulating the packet. For the destination VTEP, the MFE only needs the table 380, as this table directly maps the destination MAC address VM1 to the destination VTEP 320. Not only does the MFE 360 not need to calculate a hash and the subsequent modulo operation, but the packet 600 will be sent to the same tunnel endpoint through which the previous encapsulated packet 415 was sent out, so that all of the communication in both directions will pass through that tunnel endpoint.

However, for the source VTEP, no information is saved, so the MFE 360 calculates a hash of the source MAC address VM2 and uses this (as described above) to map to a source tunnel endpoint. In this case, the determined source tunnel endpoint is VTEP4 370, which is not the tunnel endpoint through which the first packet 415 was received. This could arise if the two MFEs use a different hash calculation, or if the MFEs have different numbers of tunnel endpoints and thus use a different modulus on the calculated hash values.

In the second stage 610, the MFE has encapsulated the packet 600 and sent the encapsulated packet 615 onto the physical network 335. In this case, the outer header source IP address is that of VTEP4 and the destination IP address is that of VTEP2. As with the first packet, the outer header source MAC address will be that of VTEP4, while the destination MAC address may be that of an intervening router in the physical network 335, if the VTEPs are not on the same physical network switch.

Furthermore, the MFE 360 stores its selection of a source tunnel endpoint (VTEP4) for packets with the source MAC address VM2 in the table 380. Thus, for future packets sent from VM 355 to VM 305, the MFE 360 will not have to perform any hash or modulo calculations, as this information will be stored entirely within its tables.

Figure 7:
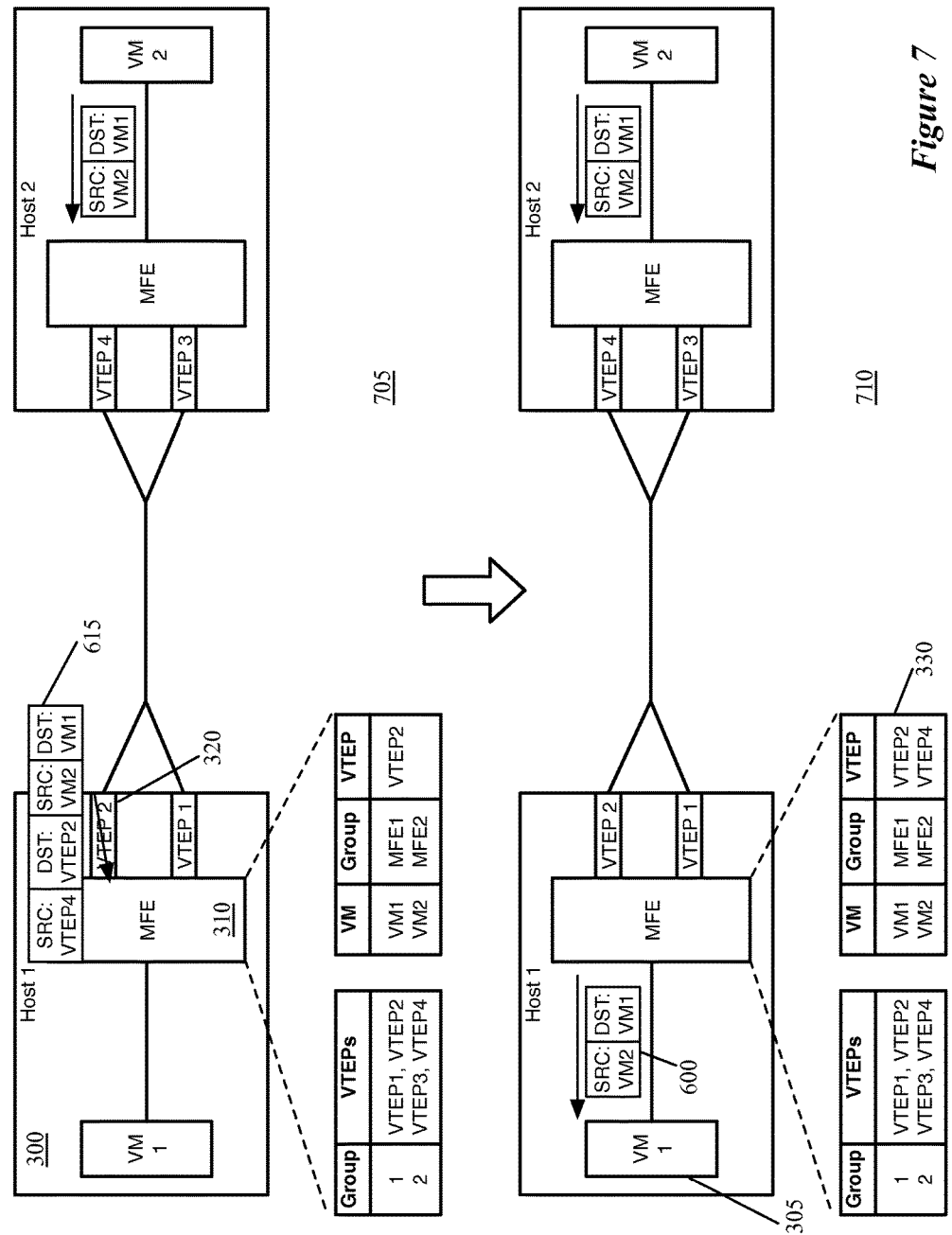

FIG. 7 illustrates the receipt of the encapsulated packet 615 by the MFE 310 over two stages 705 and 710. As shown in the first stage 705, the MFE 310 receives the encapsulated packet 615 through VTEP2 320, as the physical switches/ routers of the network 335 have forwarded the packet to the interface of the host machine 300 corresponding to this VTEP. At this point, the packet still includes the tunnel endpoint IP addresses for VTEP4 and VTEP2.

In the second stage 710, the MFE 310 has decapsulated the packet 615 and performed any additional processing so as to deliver the inner logical packet 600 to the VM 305. As noted above, in some embodiments the MFE 310 examines logical network information stored in the encapsulated packet (e.g., within the tunnel headers) and/or the destination MAC address VM1 in order to deliver the packet to the VM 305.

The MFE 310 also stores information about the source tunnel endpoint in its address:group:VTEP mapping table 330. As shown, the same information stored by the sending MFE 360 for the address VM2 is stored by the MFE 310—namely, that the MAC address VM2 maps to the tunnel endpoint VTEP4. By storing this information, the MFE will be able to use the mapping when sending future packets to the VM 355, either received at the MFE from the VM 305 or from other data compute nodes operating on the host 300. Thus, the MFE 310 now includes VTEP mappings for both its local VM 305 and the remote VM 355, and thus will not need to perform any hash or modulo calculations for packets sent between these two VMs, as illustrated in the next figure.

Figure 8:
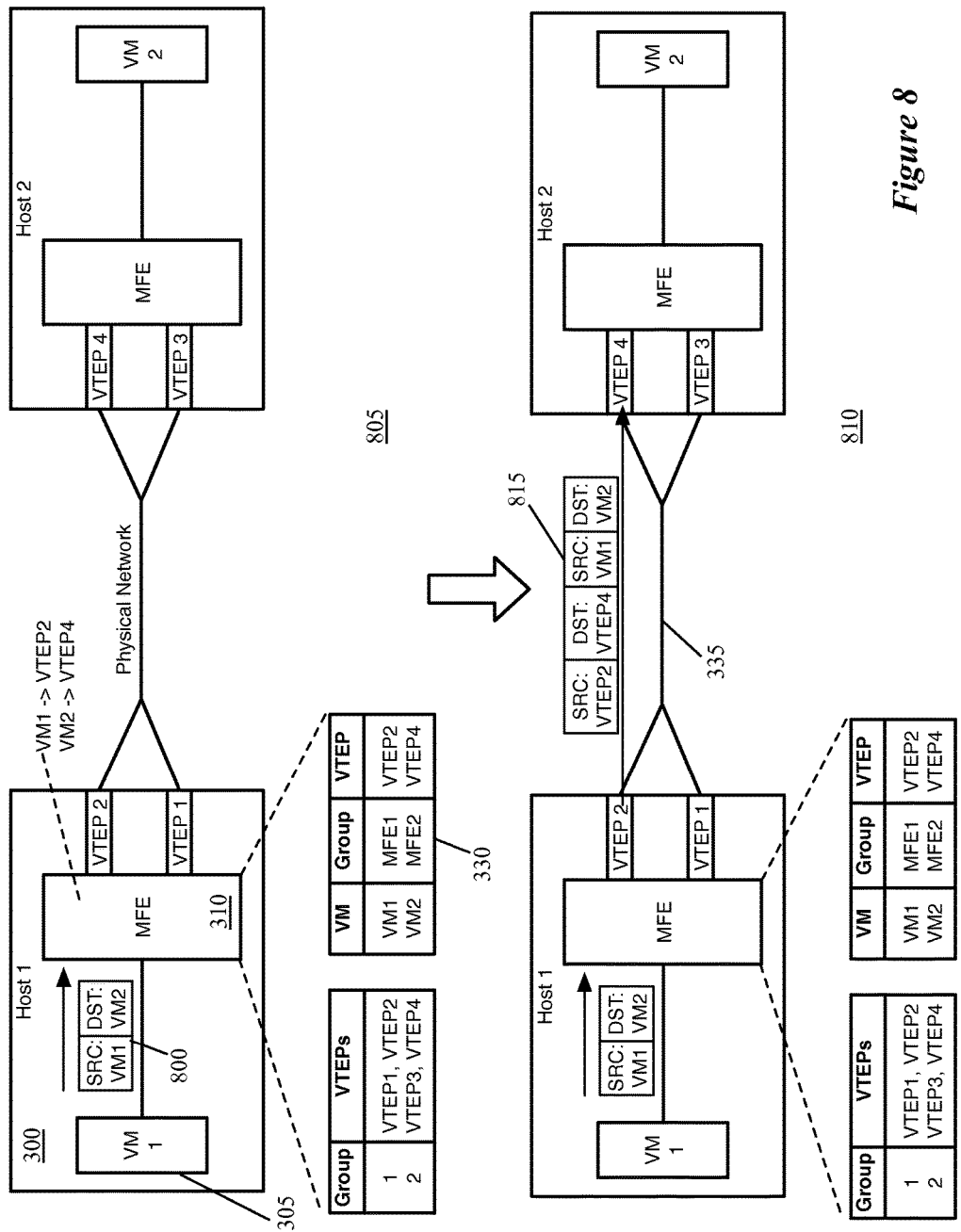

FIG. 8 illustrates the sending of a second packet 800 from the VM 305 over two stages 805 and 810. Shown in the first stage 805, as with the packet 400, this packet 800 has a source address VM1 and a destination address VM2. However, when the MFE 310 completes its other processing and determines the tunnel endpoints with which to encapsulate the packet, only the table 330 is required, as this table now contains all of the information needed to make the tunnel endpoint selections. Specifically, the table indicates that the source address VM1 maps to the tunnel endpoint VTEP2, and the destination address VM2 maps to the tunnel endpoint VTEP4.

Thus, in the second stage 810, the MFE has encapsulated the packet 800 and sent the encapsulated packet 815 onto the physical network 335. The encapsulated packet 815 will have similar outer headers to those of the packet 415, but the destination IP address is that of VTEP4 rather than VTEP3. The outer destination MAC address will be the same, unless the two VTEPs are on the same physical network switch, in which case the MAC address will also be that of VTEP4. At this point, the connection has reached an equilibrium, with packets between VM1 and VM2 being tunneled between VTEP2 and VTEP4. This equilibrium will continue unless either VTEP2 or VTEP4 goes down or, for some load balancing purposes, one or both of the MFEs changes which VTEP to use for its local VM address.

B. MFE Tunnel Endpoint Selection Processes

Figure 9:
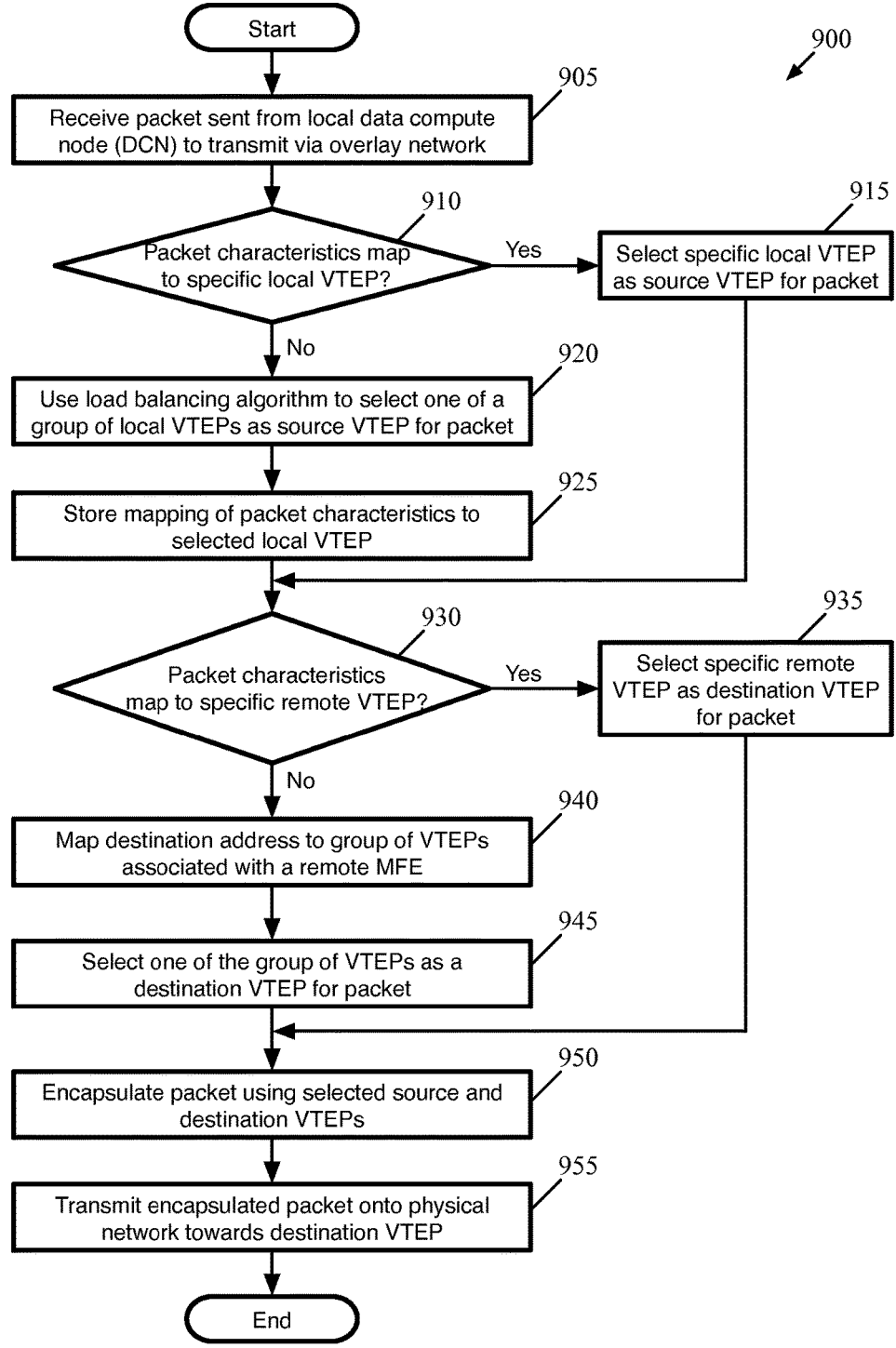
FIG. 9 conceptually illustrates a process of some embodiments performed by a MFE to select source and destination tunnel endpoints before encapsulating a packet and outputting that packet onto a physical network.

FIG. 9 conceptually illustrates a process 900 of some embodiments performed by a MFE to select source and destination tunnel endpoints before encapsulating a packet and outputting that packet onto a physical network (e.g., a network within a datacenter). This process may be performed in different manners depending on the type of MFE performing the encapsulation process.

For instance, in an ESX host of some embodiments, a virtual switch performs logical switching while a distributed virtual router performs any necessary logical routing. Each VTEP, in some embodiments, is associated with a virtual port of the virtual switch, and a stack of function calls is implemented on the port. This stack of function calls, referred to as an I/O chain, includes an operation to perform the tunnel endpoint selection operation in some embodiments.

For a kernel-based virtual machine (KVM) host, some embodiments use a flow-based MFE such as Open vSwitch. In this case, the MFE implements the tunnel selection in the flow entries received from a controller, e.g., with flow entries matching over the source or destination addresses and bundling actions that allow the MFE to choose one of the tunnel endpoints for the group to which the address is mapped. The learning aspects may be implemented using learn actions that create new flow entries when a source tunnel endpoint is selected by the MFE or a packet is received through a tunnel.

Other types of MFEs may include DPDK-based MFEs, which store the encapsulation information in their configuration database and use learn actions similar to those of a KVM host, as well as top of rack (TOR) switches. For such TOR switches with hardware VTEPs, in some embodiments a central controller updates a database (e.g., OVSDB) in the TOR with either a MAC:VTEP binding (in which case no load balancing is performed), or binding of a MAC address to all VTEPs in a group. In the former case, the central controller would perform load balancing as much as possible, with various different options for doing so. For instance, the controller could use different destination VTEPs for a MAC address across different TORs, or different destination VTEPs across logical switches on a host (e.g., send traffic for a first logical switch to VTEP1 and traffic for a second logical switch to VTEP2). When multiple data compute nodes for the same logical switch operate on a host, the central controller could configure the TORs to send traffic to different VTEPs for the different MAC addresses, even when they are on the same logical switch.

As shown, the process 900 by receiving (at 905) a packet sent from a local data compute node that needs to be transmitted via an overlay network. In various embodiments, the local data compute node could be a VM or container that connects directly (e.g., through a VNIC) to the MFE performing the process 900, a container that operates on a VM that connects directly to the MFE, a physical server connecting to a TOR switch. In some embodiments, the MFE is a gateway that connects the logical network to an external network, and the packet is actually received from an external network rather than a local data compute node. Irrespective of the source of the packet, the MFE at this point has determined that the packet requires transmission via the overlay network, and has presumably identified both the type of tunneling protocol to use as well as the logical network context information to store in the encapsulation.

The process then determines (at 910) whether the packet characteristics map to a specific local VTEP for a source VTEP. For instance, in the examples of FIGS. 4-8 above, the MFEs store tables mapping the MAC addresses to tunnel endpoints. If the received packet is not the first packet sent from the source MAC address through the MFE, then the MFE may have previously stored information (e.g., a table entry, a flow entry, etc.) mapping the source MAC address of the packet to one of its VTEPs. In other embodiments, the mapping may be connection-specific rather than MAC-specific, and the MFE uses the connection 5-tuple (source IP address, destination IP address, source transport port number, destination transport port number, and protocol) as the packet characteristics to map to a specific one of its VTEPs.

In case the MFE has only a single VTEP, then of course all traffic will map to that VTEP.

When the packet characteristics map to a specific local VTEP (e.g., because the packet is not the first of its type processed by the MFE), then the process selects (at 915) the specific local VTEP to which the packet characteristics map as the source VTEP for the packet, and proceeds to 930. On the other hand, when the packet characteristics do not map to a specific local VTEP, the process uses (at 920) a load balancing algorithm to select one of a group of local VTEPs as a source VTEP for the packet. In some embodiments, when the MFE has only a single associated group of VTEPs that are used for all logical networks, the MFE selects a VTEP from this group. On the other hand, when the MFE has multiple different groups of VTEPs (e.g., because the VTEPs connect to different zones of the physical datacenter network with which different logical networks are associated), then the MFE selects the appropriate group for the source address and logical network, and then selects one of the VTEPs in this group to use for the packet.

As mentioned, the load balancing algorithm may be hash-based (e.g., using the source MAC address, connection 5-tuple, or another set of packet characteristics), or based on the current load of the VTEPs (e.g., based on a queue or buffer of the VTEPs or the physical NICs to which the VTEPs correspond). While the examples in the previous subsection A illustrate the hashing of the source MAC address to select a VTEP, the following subsection C illustrates other techniques that may be used.

Next, the process 900 stores (at 925) the mapping of the packet characteristics to the selected local VTEP. For example, a flow-based MFE might use a learn action to create a new flow entry so that subsequent packets having the same set of characteristics will match the newly created flow entry rather than the flow entry with the learn action. Other types of MFEs may store the mapping in a table, as shown in the previous examples.

The process 900 then determines (at 930) whether the packet characteristics map to a specific remote VTEP for a destination VTEP. For instance, in the examples of FIGS. 4-8 above, the MFEs store tables mapping the MAC addresses to tunnel endpoints. If a packet has previously been received from the destination address of the current packet, then the MFE will have previously stored information (e.g., a table entry, a flow entry, etc.) mapping the destination MAC address of the current packet to a specific VTEP at the MFE used for the data compute node having that address. In other embodiments, the mapping may be connection-specific rather than MAC-specific, and the MFE uses the connection 5-tuple as the packet characteristics to map to a specific destination VTEP for the packet.

When the packet characteristics map to a specific remote VTEP, then the process selects (at 935) the specific VTEP to which the packet characteristics map as the destination VTEP for the packet. On the other hand, when the packet characteristics do not map to a specific VTEP for the destination tunnel endpoint, the MFE maps (at 940) the destination address of the packet to a group of VTEPs associated with a remote MFE. As shown in the above examples, in some embodiments each MAC address maps to a specific VTEP group, typically a set of VTEPs on the host of the data compute node having that MAC address, and thus associated with the MFE on the host. This mapping information, in some embodiments, is configured at the MFE based on updates from a central controller (which may be passed to a local controller for the MFE, which in turn updates the MFE).

The process 900 then selects (at 945) one of the VTEPs in this group as a destination VTEP for the packet. As with the source VTEP, the selection of a destination VTEP may be based on a hash of the destination MAC address, or other factors such as the connection 5-tuple. Some embodiments may send current VTEP usage information to other MFEs (e.g., as part of a keep-alive message sent between VTEPs), in which case the MFE can use this information to select a destination VTEP. However, this technique will generally not be used, as it requires sending a lot of state information between MFEs.

Having selected the source and destination tunnel endpoints, the process 900 encapsulates (at 950) the packet using the selected source and destination VTEPs. In some embodiments, the encapsulation includes the source and destination network addresses (e.g., IP addresses) of the selected VTEPs, as well as the source MAC address of the selected VTEP and an appropriate destination MAC address (that of the destination VTEP if on the same physical network switch as the source VTEP, or that of a default gateway port for the VTEP). The encapsulation may also include logical network context information (e.g., a determined logical egress port of a logical forwarding element, a logical forwarding element or logical network identifier, etc.), in addition to other information that may depend on the particular tunneling protocol used (e.g., VXLAN, STT, Geneve, etc.). The process then transmits (at 955) the encapsulated packet onto the physical network towards the destination VTEP, and ends.

Figure 10:
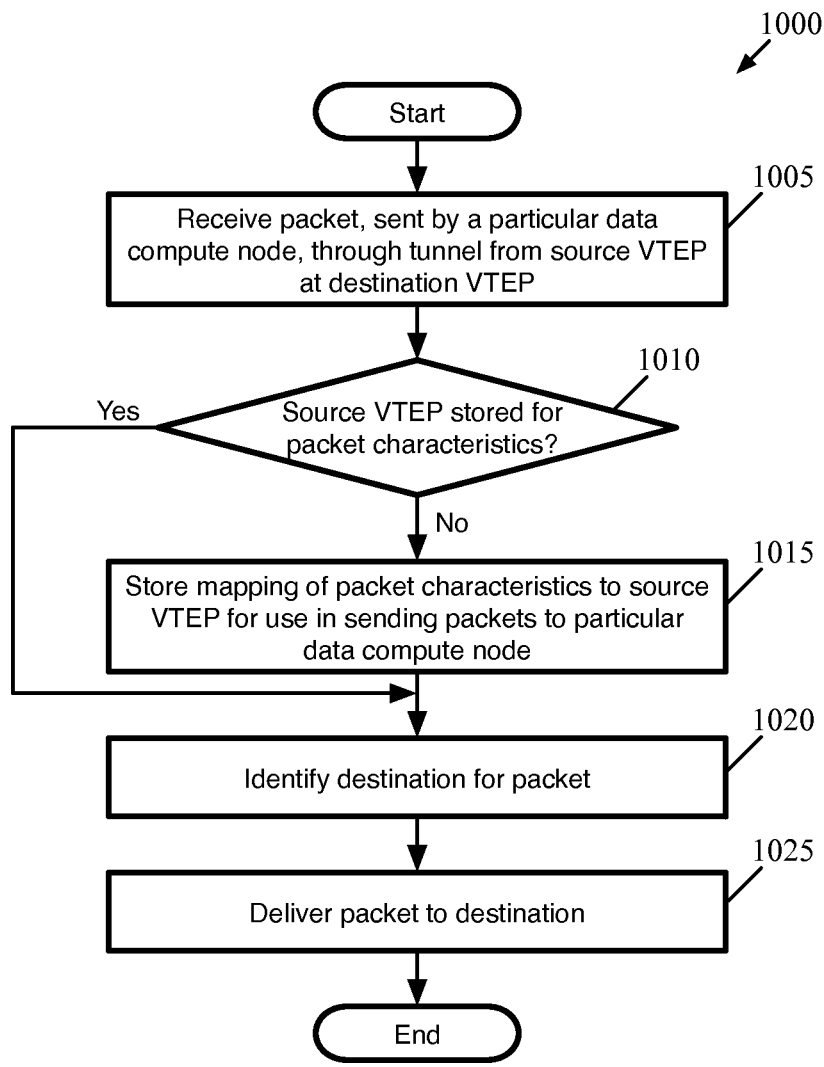
FIG. 10 conceptually illustrates a process of some embodiments performed by a MFE receiving an encapsulated packet at one of its (possibly multiple) VTEPs.

While the process 900 is performed by a sending MFE, FIG. 10 conceptually illustrates a process 1000 of some embodiments performed by a MFE receiving an encapsulated packet at one of its (possibly multiple) VTEPs. As with process 900, the process 1000 may be performed in different manners depending on the type of MFE receiving the packet (e.g., a flow-based MFE such as OVS, an ESX host, a TOR switch, etc.).

As shown, the process 1000 begins by receiving (at 1005) a packet, sent by a particular data compute node, through a tunnel from a source VTEP at the destination VTEP of the tunnel. The destination VTEP is a port of the MFE (or connects to a port of the MFE) and has a network address matching that of the destination network address of the outer headers of the received packet. In different embodiments, the packet may be encapsulated using different tunneling protocols (e.g., VXLAN, STT, Geneve, etc.).

The process then determines (at 1010) whether a mapping of the source VTEP to the packet characteristics is stored by the MFE. As shown in FIGS. 4-8, a receiving MFE stores mappings of the source MAC address to the source VTEP for encapsulated packets, so that it can use this information when sending packets to that address. In other embodiments, the receiving MFE stores a mapping of other packet characteristics, such as the connection 5-tuple, to the source VTEP. When the mapping is not already stored by the MFE, the process stores (at 1015) this mapping of packet characteristics to the source VTEP for use in sending packets to the particular data compute node that sent the received packet.

Having decapsulated the packet, the process identifies (at 1020) a destination for the packet. The process then delivers (at 1025) the packet to this identified destination. This destination may be a VM, a container, a physical server (if the MFE is a TOR), an external network (if the MFE is a gateway), etc.

C. Alternative Load Balancing Techniques

In the examples of subsection A above, the selection of both source and destination tunnel endpoints was determined based on the source and destination MAC addresses, respectively. For a MFE with a large number of data compute nodes attached, this will often balance traffic relatively well between the tunnel endpoints of the MFE, assuming that the MAC addresses are distributed randomly and thus assigned in close to equal numbers to the different tunnel endpoints. However, if one or two of the data compute nodes has far more traffic than the others, then the tunnel endpoint to which that data compute node's address is assigned will be disproportionately burdened.

Figure 11:
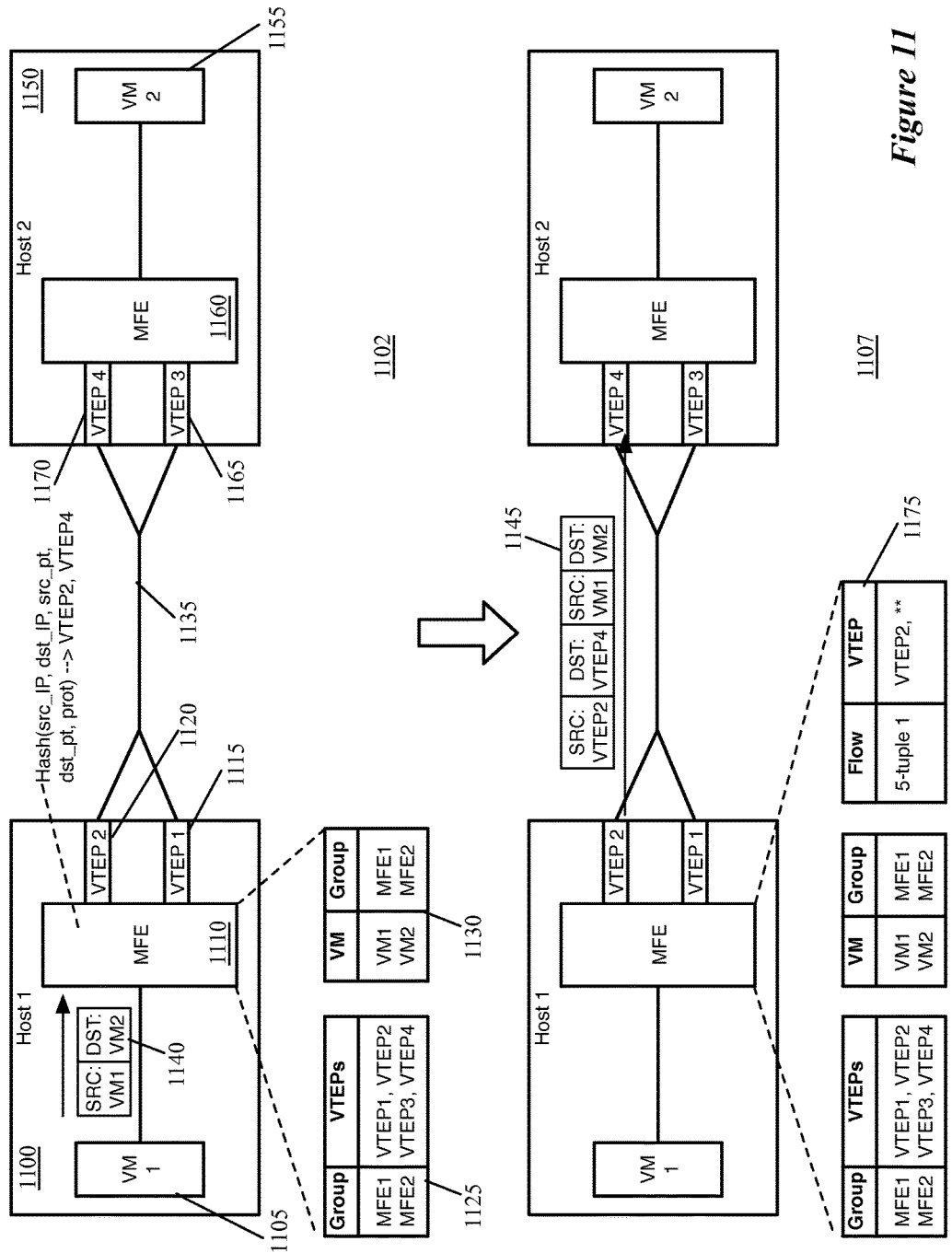
FIG. 11 illustrates a pair of host machines that are connected through a physical network and that have MFEs that load balance on a per-flow basis.

Thus, some embodiments use other load balancing techniques. For example, FIGS. 11 and 12 conceptually illustrate the use of the connection 5-tuple to separately assign each flow to a tunnel endpoint, for finer load balancing granularity. FIG. 11 illustrates a pair of host machines 1100 and 1150 that are connected through a physical network 1135 over two stages 1102 and 1107. Similarly to the host machines of FIGS. 3-8, the host machine 1100 includes a VM 1105 that connects to an MFE 1110 also operating on the host machine 1100. The MFE 1110 has two VTEPs 1115 and 1120. The second host machine 1150 includes a VM 1155 that connects to a MFE 1160 also operating on the host machine 1150, which has two VTEPs 1165 and 1170.

The MFE 1100 also stores tables similar to those shown in FIG. 3, with a first table 1125 mapping VTEP groups to lists of VTEPs, and a second table 1130 mapping MAC addresses to VTEP groups. As shown in the first stage 1102, the VM 1105 sends a packet 1140 to the MFE, the packet having source address(es) VM1 and destination address(es) VM2. As in the previous example, the MFE performs logical network processing for the packet, and determines (using table 1130) that the destination address maps to the MFE2 group of VTEPs, and (using table 1125) that this group of VTEPs includes VTEP3 and VTEP4.

However, rather than hashing the source MAC address to determine the source VTEP and the destination MAC address to determine the destination VTEP, the MFE 1110 hashes the connection 5-tuple of source and destination IP addresses (e.g., the IP addresses of VM 1105 and VM 1110), source and destination transport layer port numbers, and the transport layer protocol (e.g., TCP, UDP, etc., which is specified in the IP header of the packet). Based on this hash (and, e.g., using a modulo function to select a VTEP from each group), the MFE 1110 determines that for packets in this flow, the source VTEP is VTEP2 1120. In addition, for at least the first packet, the MFE will use VTEP4 1170 as the destination VTEP.

As such, in the second stage 1107, the MFE has encapsulated the packet 1140 and sent the encapsulated packet 1145 onto the physical network 1135. The encapsulated packet 1145 includes outer headers with source and destination network addresses of the interfaces VTEP2 (as the source) and VTEP4 (as the destination). In addition, the MFE 1110 stores its selection of a source tunnel endpoint for the flow to which the packet 1140 belongs in a table 1175. In this case, the table 1175 stores a mapping of a 5-tuple for an ongoing flow to source and destination VTEPs to use for that flow. However, as in the MAC address-based examples above, the MFE 1110 only stores the source VTEP at this stage. The receiving MFE 1160 will also store this VTEP as the destination tunnel endpoint to use for reverse direction packets, and perform its own load balancing to select a source VTEP when it processes the first reverse direction packet for the flow. After this next packet, a steady state will be achieved, as the MFEs 1110 and 1160 at either end of the tunnel will have stored information for both selected VTEPs.

Figure 12:
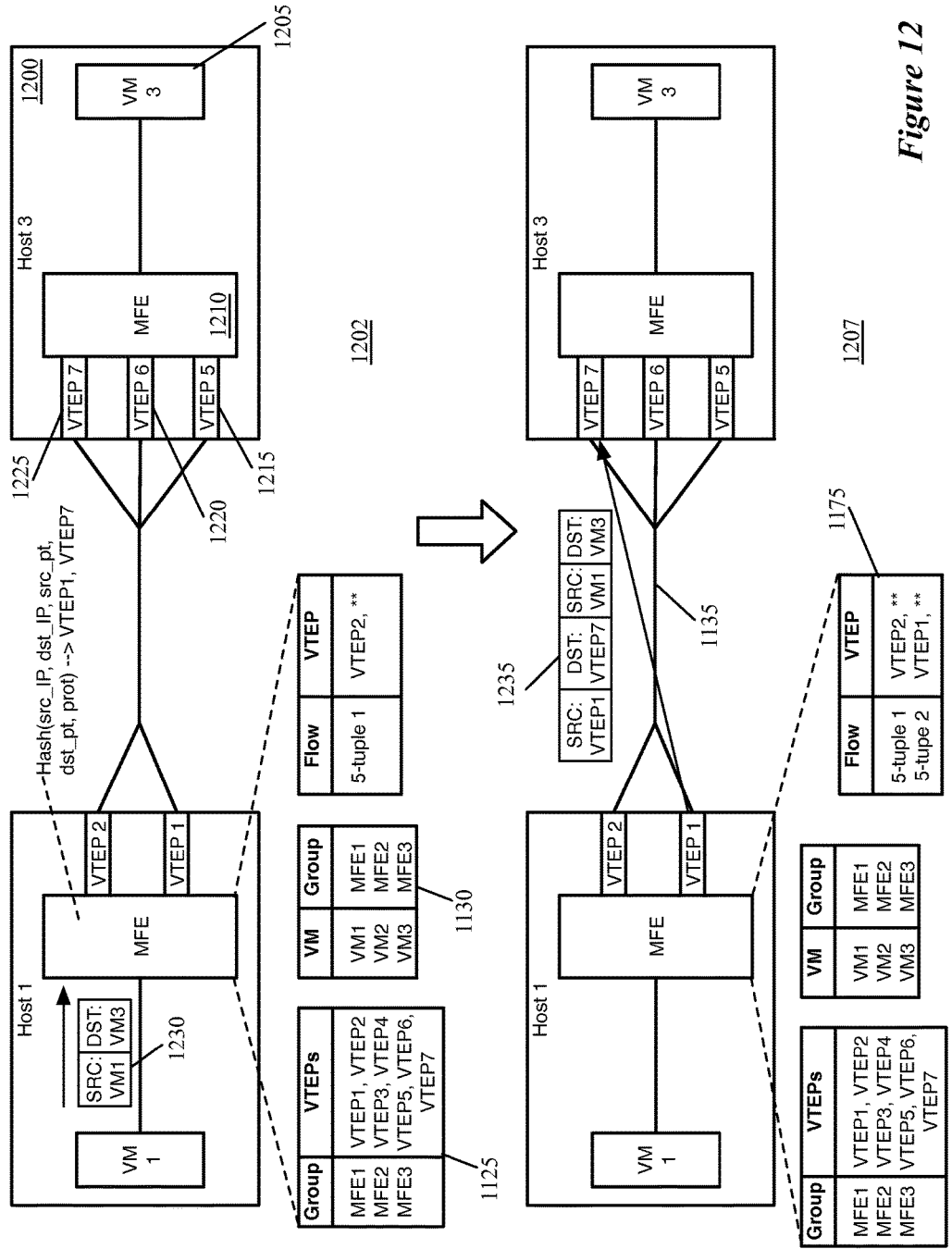
FIG. 12 illustrates that a third host machine with a third VM and a third MFE is connected to the same physical datacenter network of FIG. 11.

FIG. 12 illustrates that a third host machine 1200 with a third VM 1205 and a third MFE 1210 is connected to the same physical datacenter network 1135. The MFE 1210 has three VTEPs 1215-1225. This figure illustrates a sending of a packet from the VM 1105 to VM 1205 over two stages 1202 and 1207. In the first stage, the MFE 1110 receives a packet 1230 from the VM 1105, with a source MAC address VM1 and a destination address VM3. The MFE performs logical network processing for the packet, and determines (using table 1130) that the destination address maps to the MFE3 group of VTEPs, and (using table 1125) that this group of VTEPs includes VTEP5, VTEP6, and VTEP7.

Furthermore, as this is a new flow, no entry exists in the table 1175 for the 5-tuple of the packet, even though previous packet(s) sent by VM 1105 have been processed by the MFE 1110 (e.g., the packet 1140). Thus, the MFE 1110 hashes the connection 5-tuple of this new packet, and determines (e.g., by using a modulo function to select a VTEP from each group) that for packets in this flow, the source VTEP is VTEP1 1115 and the destination VTEP is VTEP7 1225. Thus, even though the source MAC address is the same for packet 1140 and packet 1230, hashing the connection 5-tuple results in different source VTEPs for the encapsulation of these packets.

In the second stage, the MFE 1110 has encapsulated the packet 1230 and sent the encapsulated packet 1235 onto the physical network 1135. The encapsulated packet 1235 includes outer headers with source and destination network addresses of the interfaces VTEP1 (as the source) and VTEP7 (as the destination). In addition, the MFE 1110 stores its selection of a source tunnel endpoint for the flow to which the packet 1230 belongs in the table 1175. As in the previous example of FIG. 11, the MFE 1110 only stores the source VTEP, and learns the destination VTEP when the MFE 1210 sends a return packet.

Figure 13:
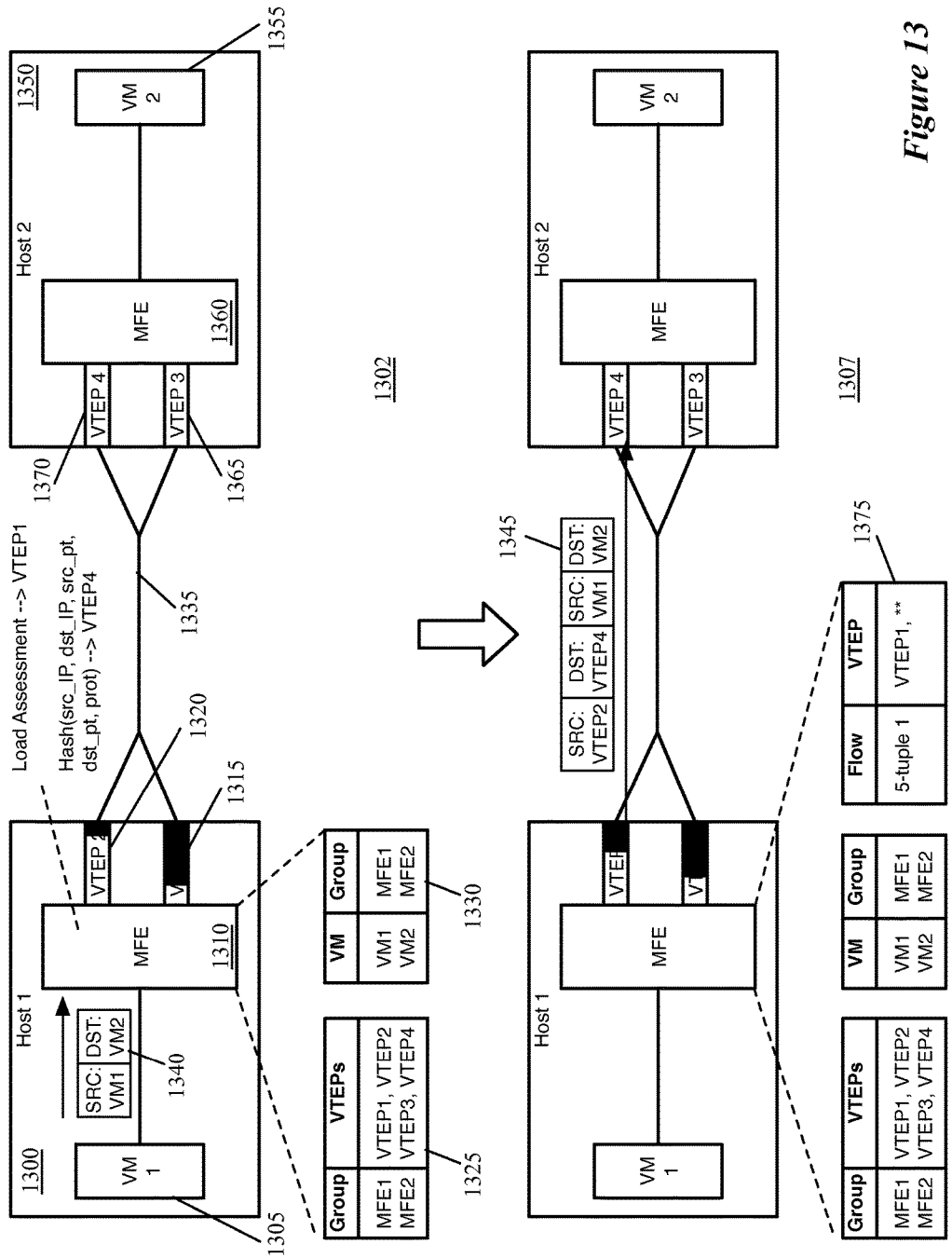
FIG. 13 conceptually illustrates the use of load assessment to assign a source VTEP for a flow.

FIG. 13 conceptually illustrates the use of load assessment to assign a source VTEP for a flow over two stages 1302 and 1307. This figure illustrates a pair of host machines 1300 and 1350 connected through a physical network 1335. Similarly to the host machines of FIGS. 3-8, the host machine 1300 includes a VM 1305 that connects to a MFE 1310 also operating on the host machine 1300. The MFE 1310 has two VTEPs 1315 and 1320. The second host machine 1350 includes a VM 1355 that connects to a MFE 1360 also operating on the host machine 1350, which has two VTEPs 1365 and 1370. The MFE 1300 also stores tables similar to those shown in FIG. 3, with a first table 1325 mapping VTEP groups to lists of VTEPs and a second table 1330 mapping MAC addresses to VTEP groups.

As shown in the first stage 1302, the VM 1305 sends a packet 1340 to the MFE, the packet having source address(es) VM1 and destination address(es) VM2. As in the previous example, the MFE performs logical network processing for this packet, and determines (using table 1130) that the destination address maps to the MFE2 group of VTEPs and (using table 1125) that this group of VTEPs includes VTEP3 and VTEP4. In this case, neither the MAC address nor the connection 5-tuple maps directly to a specific VTEP.

However, rather than hashing any of the packet characteristics to determine a source VTEP, the MFE assesses the load on the different VTEPs. In some embodiments, the MFE assesses the buffer or queue of each VTEP (or the physical NIC associated with the VTEP). As shown by the black bars, the buffer in the first VTEP1 1315 is fuller than that of the second VTEP2 1320, so the MFE 1310 assigns VTEP2 as the source VTEP for the packet 1340. For the destination VTEP, there is no load to assess (because this information is not known to the MFE 1310), so the MFE calculates a hash of the connection 5-tuple (or of the MAC address) to determine the destination VTEP to use (in this case, the VTEP4 1370).

As such, in the second stage 1307, the MFE 1310 has encapsulated the packet 1340 and sent the encapsulated packet 1345 onto the physical network 1335. The encapsulated packet 1345 includes outer headers with source and destination network addresses of the interfaces VTEP2 (as the source) and VTEP4 (as the destination). In addition, the MFE 1310 stores its selection of a source tunnel endpoint for the flow to which the packet 1340 belongs in a table 1375, which stores mappings of 5-tuples for ongoing flows to source and destination VTEPs to use for that flow. As in the previous examples, the MFE stores only the source VTEP, allowing the MFE 1360 to select one of its VTEPs (e.g., based on similar load balancing techniques, a hash of the 5-tuple, etc.). In other embodiments, no information is stored for either the source or destination VTEP, as the MFE performs the load balancing on a per-packet basis. In this case, the decision is made that more optimized load balancing outweighs the benefits of having incoming and outgoing packets for a flow passing through the same VTEP.

D. Handling Duplicate Traffic from Physical Network

As shown in the above examples, the MFEs of some embodiments connect through multiple tunnel endpoints to physical network switches. As a result, in some cases a MFE may receive multiple copies of the same packets. For example, when the physical switch to which multiple VTEPs of the same MFE attach receives a packet with the VTEP address, normally the switch will know to which port to send the packet. However, for the first packet, this switch may not have the destination MAC address in its table, so it floods all of its ports, including all of the VTEPs on the MFE. However, all of these VTEPs are ports on the same MFE, and it is not beneficial for the MFE to process multiple such packets. So that the MFE does not have to process multiple copies of the same packet, some embodiments perform a check on the outer headers in order to filter out traffic received on all but one of the physical NICs (as it is the physical NICs that actually connect to the physical network switch).

If this traffic was destined for a data compute node connected to the MFE, then the filtering (e.g., using reverse path forwarding) prevents the delivery of multiple copies of the same packet to the data compute node, when doing so could have adverse affects on the communication between the data compute node and the source of the packet. Typically, a MFE will perform the filtering by checking a packet's inner headers against the physical NIC on which the packet was received. When a data compute node is statically mapped to only a single VTEP (even if multiple VTEPs are present on the MFE), then the copies sent to the other physical NICs would not be delivered to the data compute node anyway. However, in the examples herein, the data compute nodes are not statically assigned to a particular VTEP or physical NIC, but instead packets for a particular data compute node could arrive on any of the VTEPs and physical NICs. Therefore, some embodiments perform a filtering check (e.g., reverse path forwarding) based on the outer headers to avoid duplicates, which also prevents the need to look at inner headers after decapsulation to perform a filtering check.

E. Handling Loss of VTEP or pNIC Functionality

Some embodiments bind each VTEP to a different physical NIC, as mentioned above. Because the physical network switch treats each physical NIC as a separate port, a VTEP should be assigned to only one physical NIC in this situation (because packets with the source MAC address of a particular VTEP should only be sent to one port of the physical network switch.

With the use of data compute node address to VTEP group binding, when a physical NIC goes down, the VTEP does not need to be switched to a different uplink; instead, the VTEP is removed (at least temporarily) from the list of VTEPs associated with the VTEP group, and packets from local data compute nodes are no longer sent out of that VTEP in some embodiments. Furthermore, the central network controllers may learn of the VTEP going down based on either self-reporting by the local controller for that MFE or by other MFEs. When a VTEP goes down, the other VTEPs will detect this because the keep-alive messages between tunnel endpoints will no longer be received from the down VTEP. In some embodiments, the MFEs with the other VTEPs detect the downed VTEP and report this information to the central controllers.

For the VTEP selection, different embodiments may re-assign the flows and/or MAC addresses assigned to the down VTEP in different manners. For example, some embodiments simply re-hash the source address on the next packet in a flow or from a MAC address, and use a different modulus to account for the different number of VTEPs. Flows or MAC addresses that are already assigned to a VTEP that remains up do not need to, but may, move, and the new packets should be spread equally among the remaining VTEPs.

II. Bridge Clusters with Multiple VTEPs

In addition to sending packets through tunnels to MFEs with multiple tunnel endpoints in order to reach a remote data compute node, in some cases a MFE receives a packet from one of its local data compute nodes that needs to be bridged to another remote network (e.g., another logical network, a VLAN, etc.). Some embodiments use bridge clusters for performing this bridging, which may include multiple MFEs (some or all of which may have multiple tunnel endpoints). All of the tunnel endpoints associated with a bridge cluster may be grouped, and the source MFE performs a similar selection process (e.g., hashing the destination address or connection 5-tuple) to select a tunnel endpoint in the bridge cluster group to which to send the packet.

Figure 14:
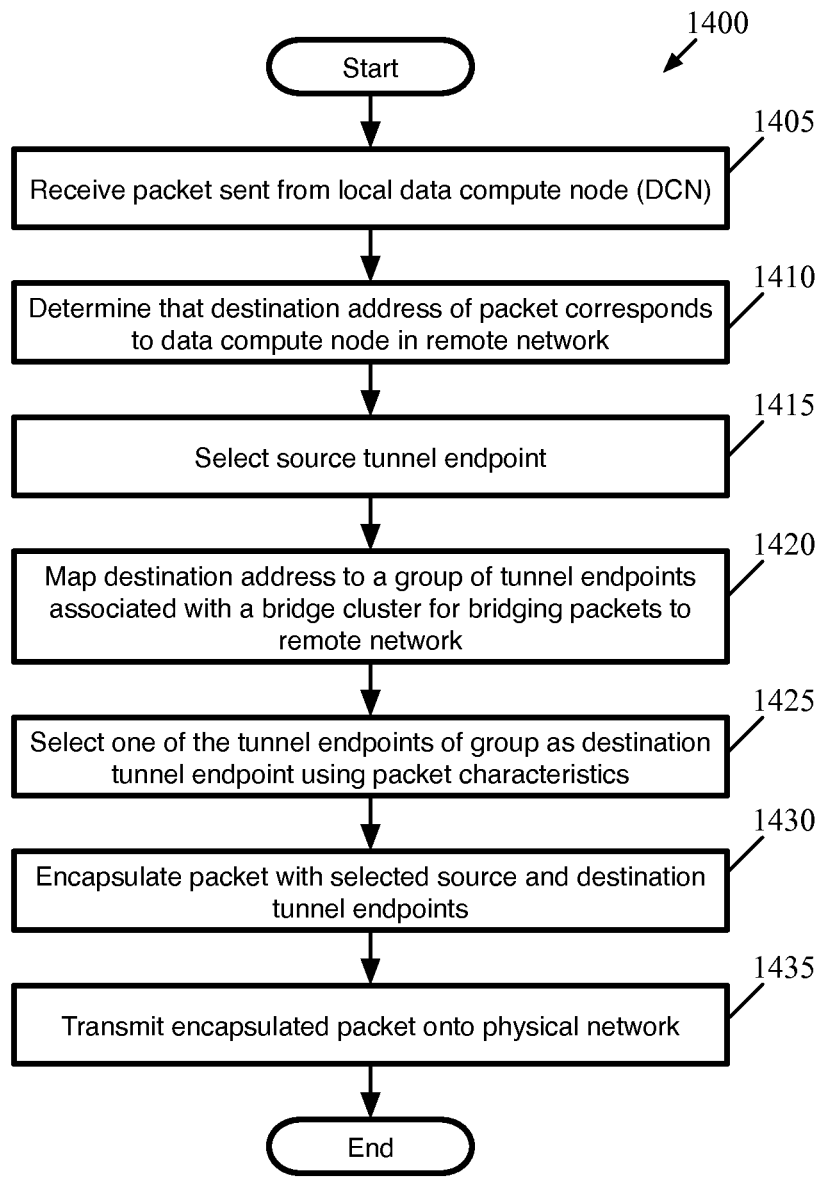
FIG. 14 conceptually illustrates a process of some embodiments performed by a MFE to select source and destination tunnel endpoints for a packet to be sent to a remote network.

FIG. 14 conceptually illustrates a process 1400 of some embodiments performed by a MFE to select source and destination tunnel endpoints for a packet to be sent to a remote network (e.g., a remote layer 2 network). As with the process 900 of FIG. 9, this process 1400 may be performed in different manners depending on the type of MFE performing the encapsulation process (e.g., whether the MFE uses flow entries, lookup tables, etc.).

As shown, the process 1400 begins (at 1405) by receiving a packet sent from a local data compute node (i.e., a data compute node for which the MFE is a first-hop MFE). The data compute node could be a VM or container operating on the same host as the MFE, a physical server that connects to a TOR switch, etc.

The process then determines (at 1410) that the destination address of the packet corresponds to a data compute node in a remote network that requires bridging. In some embodiments, a first set of data compute nodes in a first layer 2 network (e.g., a network connected with an overlay, such as a VXLAN, STT, Geneve, etc. overlay) may be on the same logical switch as a second set of data compute nodes in a second layer 2 network (e.g., another overlay network, a physical VLAN network, etc.). These two layer 2 networks might not be located in the same datacenter or physical zone of a datacenter, and therefore they are treated as separate layer 2 networks requiring a bridge. Thus, when an MFE in a first layer 2 network receives a packet with a destination address in the second layer 2 network, the MFE tables identify the MAC address as requiring bridging.

Next, the process 1400 selects (at 1415) a source tunnel endpoint. This selection may be performed in any of the manners described in the previous section. That is, the MFE might select a source tunnel endpoint based on a previously determined and stored mapping of a source MAC address to a tunnel endpoint. The MFE could also, in different embodiments, select the tunnel endpoint from a group of tunnel endpoints based on a hash of the source MAC address, a hash of the connection 5-tuple, an assessment of the load on the various tunnel endpoints, or other load balancing techniques.

The process also maps (at 1420) the destination address of the received packet to a group of tunnel endpoints associated with a bridge cluster for bridging packets to a remote network. In some embodiments, tunnel endpoints may be associated with groups generically. In other embodiments, there are both MFE labels and MFE-group labels for tunnel endpoints. A bridge cluster may include several MFEs, each of which have one or more tunnel endpoints. Thus, for a packet that needs to be bridged, the destination address is mapped to the group of MFEs that form the bridge cluster (i.e., the MFEs with the ability to bridge packets to the destination layer 2 network). This group is itself mapped to a set of tunnel endpoints. The set of tunnel endpoints may include all of the tunnel endpoints of the MFEs in the group of MFEs, or only a subset of some or all of the MFEs if some tunnel endpoints do not have connectivity into the same zone of the datacenter as the MFE performing the process 1400.

Next, the process selects (at 1425) one of the tunnel endpoints of the group as a destination tunnel endpoint based on the packet characteristics. For example, different embodiments might use a load balancing technique that hashes the destination MAC address or the connection 5-tuple and selects one of the tunnel endpoints in a group based on this hash result (e.g., using a modulus function as described above). In addition, some embodiments may store mappings of destination MAC addresses (or flows) to bridge cluster VTEPs, when packets are received in return from the data compute node in the remote network. Once the source and destination tunnel endpoints have been selected, the process encapsulates (at 1430) the packet with the selected tunnel endpoints, transmits (at 1435) the packet onto the physical network, and ends.

Figure 15:
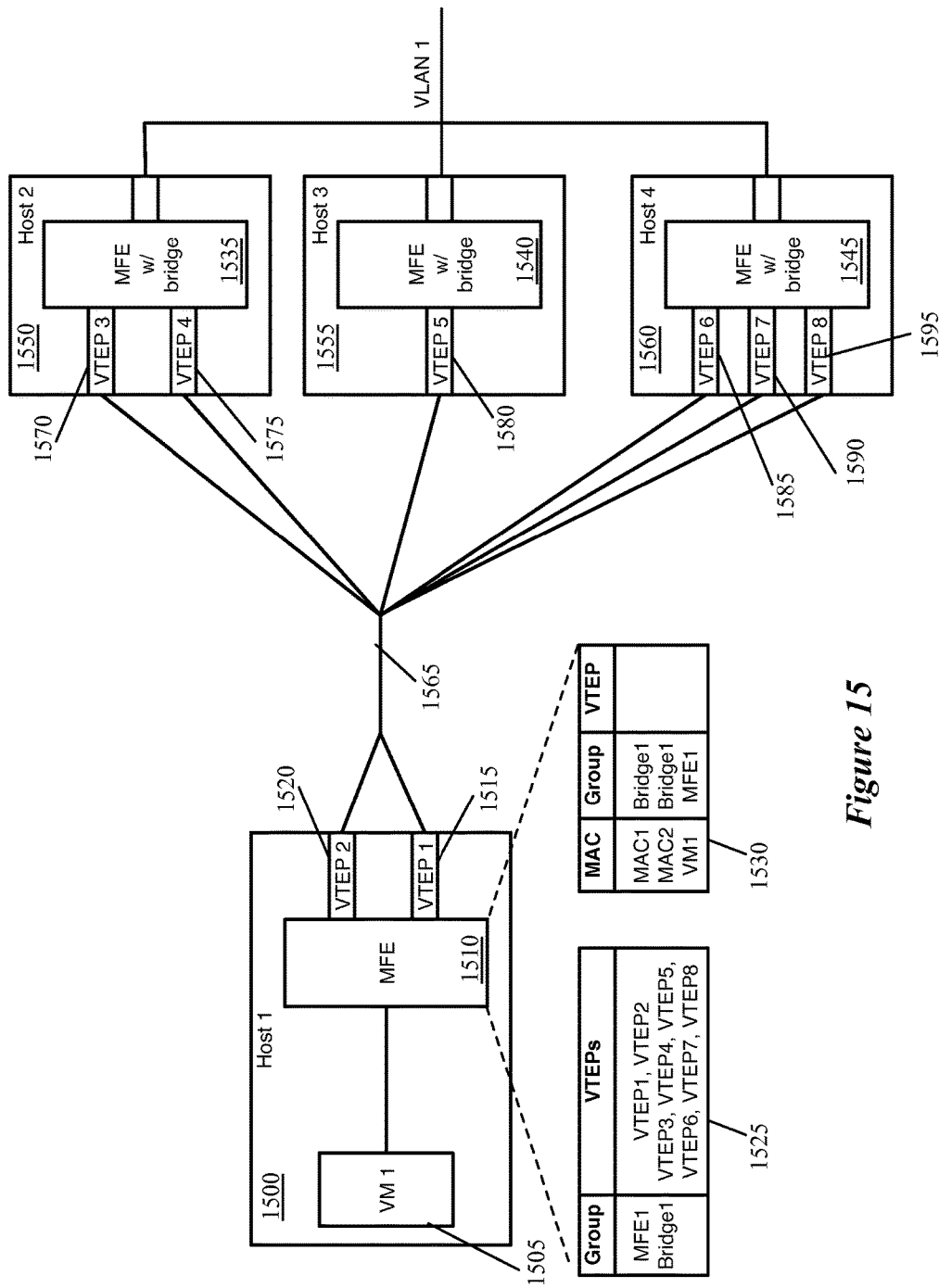
FIG. 15 conceptually illustrates an example of a datacenter network including a bridge cluster that provides bridging connectivity between a first network on which a first VM is located and a second network.

FIG. 15 conceptually illustrates an example of a datacenter network including a bridge cluster that provides bridging connectivity between a first network on which a first VM is located and a second network. As shown in the figure, a host machine 1500 includes a VM 1505 and a MFE 1510 to which the VM 1505 connects, with two VTEPs 1515 and 1520. the MFE 1500 stores a first table 1525 mapping VTEP group identifiers to lists of VTEPs and a second table 1530 mapping MAC addresses to VTEP group identifiers. The group identifiers include MFE1 for the MAC address VM1 of the VM 1505, as well as a bridge cluster Bridge1 for two MAC addresses MAC1 and MAC2.

The figure also illustrates three MFEs 1535-1545 on three hosts 1550-1560 that perform bridging to the physical network VLAN1. This is the network on which the data compute nodes having MAC addresses MAC1 and MAC2 are located. These MFEs 1535-1545 each have different numbers of VTEPs, all of which are connected through the physical network 1565 to the VTEPs 1515 and 1520 of the MFE 1510. Specifically, the MFE 1535 has two VTEPs 1570 and 1575, the MFE 1540 has a single VTEP 1580, and the MFE 1545 has three VTEPs 1585-1595. Though not shown, some or all of these host machines 1550-1560 may host virtual machines or other data compute nodes (e.g., on completely separate logical networks from VM1) and serve as first-hop MFEs for these data compute nodes.

Figure 16:
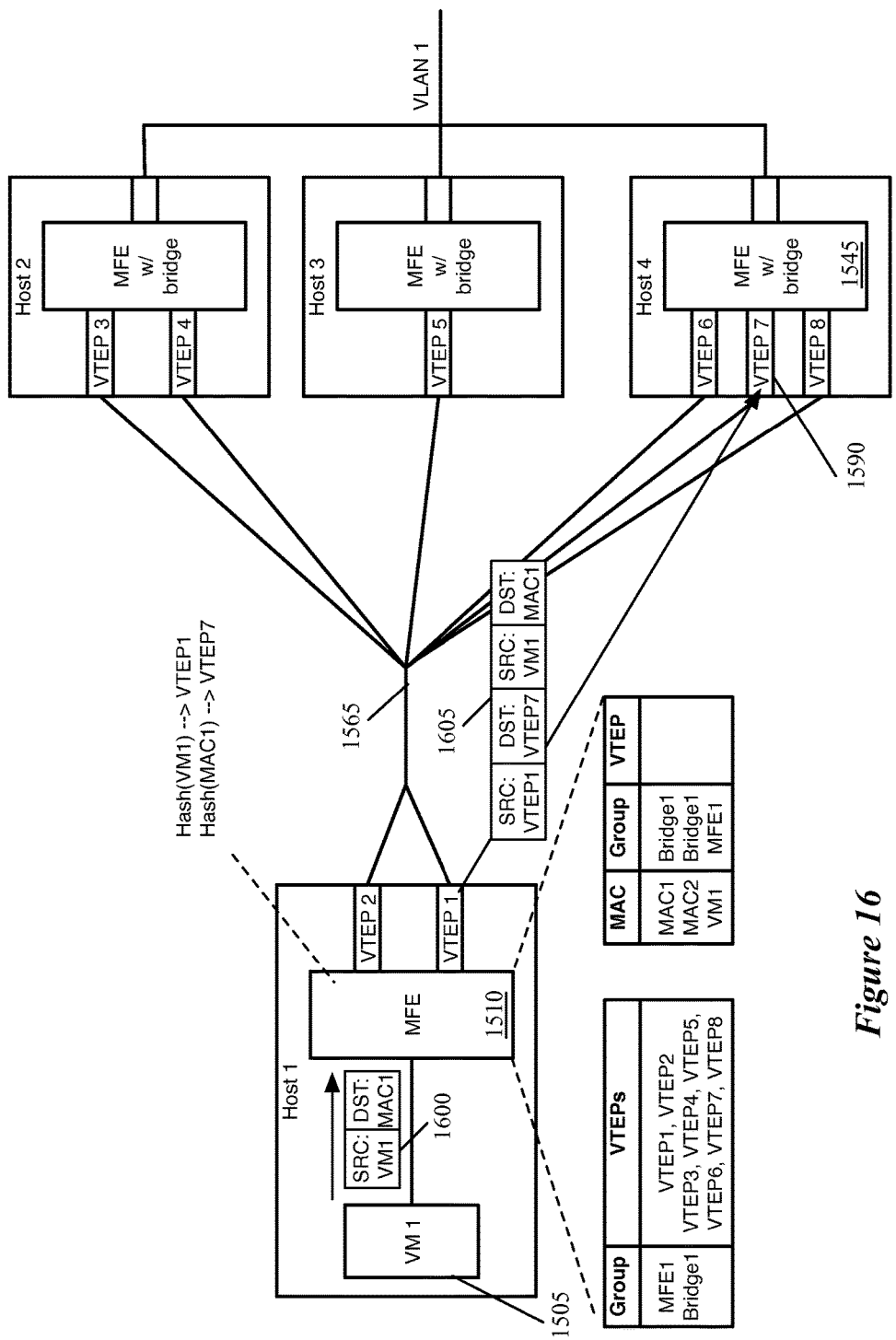
FIG. 16 conceptually illustrates the sending of a packet from the VM of FIG. 15 to a MAC address (MAC1) in the bridged network.

FIG. 16 conceptually illustrates the sending of a packet 1600 from the VM 1505 to a MAC address (MAC1) in the bridged network VLAN1. As shown, the VM 1505 sends a packet 1600, with source address VM1 and destination address MAC1, to the MFE 1510. The MFE 1510 processes the packet and determines that the MAC address MAC1 maps to a bridge between two layer 2 networks. Using the table 1130, the MFE 1510 identifies the VTEP group Bridge1 for the address, and using the table 1125 identifies the six possible VTEPs for this VTEP group. In this case, the MFE 1510 uses MAC-based hashing to determine source and destination VTEPs, and therefore hashes the address VM1 to get a source tunnel endpoint of VTEP1 and the address MAC1 to get a destination tunnel endpoint of VTEP7. Thus, the MFE 1510 encapsulates the packet 1600 with these source and destination addresses in the outer encapsulation headers, and sends the encapsulated packet 1605 onto the physical network 1565. The MFE 1545 will receive this encapsulated packet, remove the encapsulation, and perform the necessary additional operations to bridge the packet onto VLAN1.

Figure 17:
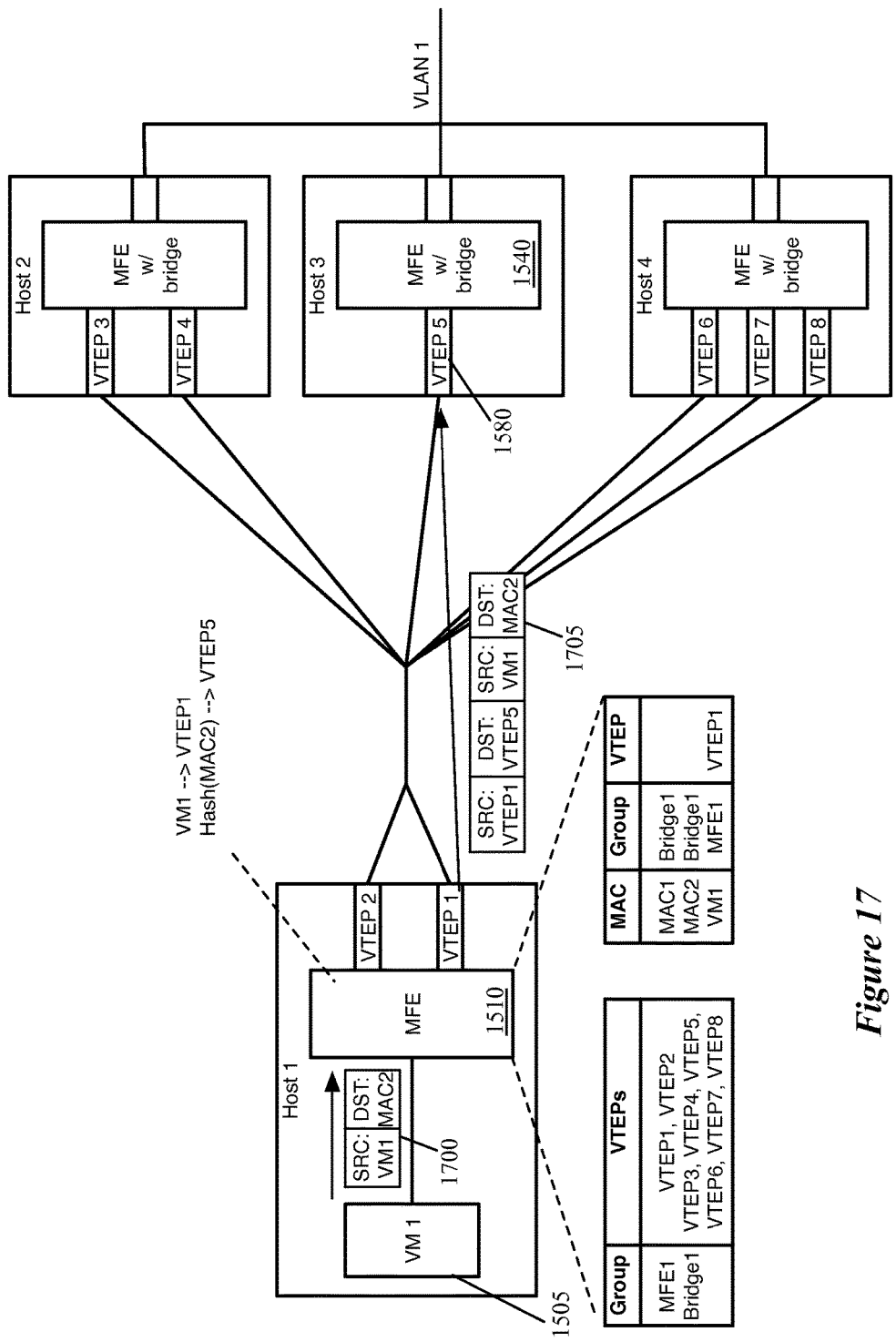
FIG. 17 conceptually illustrates the sending of a packet from the VM of FIG. 15 to a different MAC address (MAC2) in the bridged network.

FIG. 17 conceptually illustrates the sending of a packet 1700 from the VM 1505 to a different MAC address (MAC2) in the bridged network VLAN1. As shown, the VM 1505 sends a packet 1700, with source address VM1 and destination address MAC2, to the MFE 1510. The MFE 1510 processes the packet in the same way as the previous packet 1600 to determine that the MAC address MAC2 maps to a bridge between the two layer 2 networks. Using the table 1130, the MFE 1510 identifies the VTEP group Bridge1 for the address MAC2, and using the table 1125 identifies the six possible VTEPs for this group. In this case, the MFE 1510 identifies the source VTEP as VTEP1 based on information stored from the processing of the previous packet 1600. However, no information is stored mapping MAC2 to a specific VTEP, so the MFE calculates a hash to select VTEP5 1580 from the bridge cluster VTEP group.

Not only is this a different VTEP than used for bridging the previous packet 1700, but is actually a VTEP on a completely different MFE 1540. However, all of these three MFEs 1535-1545 have the ability to bridge packets to the same VLAN, so there is no issue with sending packets for the VLAN to different MFEs in the cluster. Using the selected VTEPs, the MFE 1510 encapsulates the packet 1700 with the source and destination addresses of these VTEPs in the outer encapsulation headers, and sends the encapsulated packet 1705 onto the physical network 1565. The MFE 1540 will receive this encapsulated packet, remove the encapsulation, and perform the necessary additional operations to bridge the packet onto VLAN1.

III. Central Controller Operations

In the various examples shown above, the MFEs are populated with tables mapping MAC addresses to tunnel endpoint groups identifiers (e.g., tunnel endpoints of a particular MFE or a group of MFEs) as well as tables mapping tunnel endpoint group identifiers to sets of tunnel endpoints. Using these tables, a sending MFE can map a destination MAC address to a group of potential tunnel endpoints and then select one of these endpoints in a number of different ways. In some embodiments, the MFEs are populated by a network control system, which may include a central controller (or multiple central controllers) as well as local controllers that act as intermediaries and translators between the central controller and MFEs.

Figure 18:
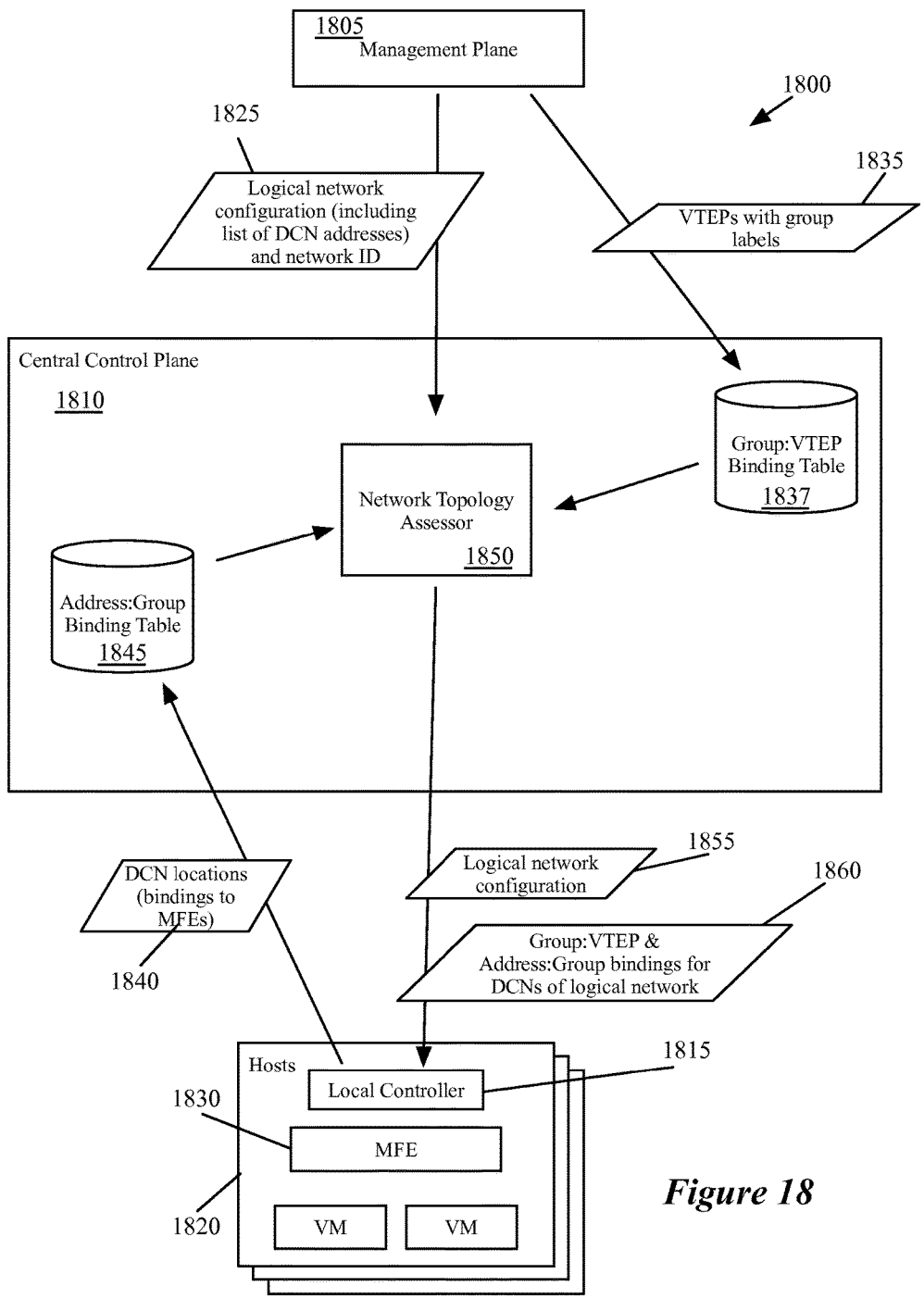
FIG. 18 conceptually illustrates a network control system of some embodiments, as well as the transfer of data within this network control system as it pertains to the mapping tables configured on the MFEs.

FIG. 18 conceptually illustrates a network control system 1800 of some embodiments, as well as the transfer of data within this network control system as it pertains to the mapping tables configured on the MFEs. The network control system, as shown, includes a management plane 1805, a central control plane 1810, and local controllers 1815 operating on host machines 1820. In some embodiments, the management plane 1805 and control plane 1810 are both modules, or applications, on a single network controller machine. They may also be distributed, in that both the management plane and central control plane operate on numerous network controllers, with different controllers handling the configuration of different logical networks. In other embodiments, the management plane 1805 and central control plane 1810 are implemented in separate physical machines. For instance, the network control system of some embodiments may have numerous machines on which the management plane operates and numerous other machines on which the central control plane operates.

The management plane 1805 of some embodiments is responsible for receiving logical network configurations through an API (e.g., from users of a cloud management system) and converting that network configuration data into an internal representation of the logical networks (e.g., as a set of database tables). For instance, in some embodiments, the management plane receives a logical network of switches and routers connected to each other, and defines constructs for logical switch, logical switch port, logical router, logical router port, etc. Each logical switch, in some embodiments, has a set of MAC and/or IP addresses assigned to its logical ports, with each MAC address corresponding to a different data compute node that will be implemented in the logical network. As shown in the figure, in some embodiments the management plane 1805 passes this logical network configuration data 1825 to the central control plane 1810. The information may include, in addition to the connections of logical forwarding elements to each other, a list of data compute node addresses (e.g., MAC addresses) for each logical switch as well as logical network, logical forwarding element, and/or logical port identifiers. These identifiers may be used in the encapsulations of some embodiments in order to encode logical network context information in the overlay packets sent between MFEs for the logical network.

The management plane 1805, in some embodiments, also configures the VTEPs on the various MFEs 1830 on host machines 1820, as well as VTEPs on TOR switches, bridge cluster MFEs, gateways, etc. Because the management plane 1805 knows the information for each VTEP and on which MFE the VTEP is provisioned, the management plane can assign VTEPs to groups (by, e.g., assigning a MFE label for individual MFEs as well as group labels for groups of MFEs in a bridge cluster). Thus, the management plane 1805 additionally passes to the central control plane a list 1835 of VTEPs configured in the network with their group labels.

The central control plane 1810 of some embodiments stores a binding table 1837 of group labels to VTEPs. In some embodiments, the central control plane 1810 organizes this table by groups, with each row for a group having a list of all the VTEPs in the group (similar to the tables shown for the various MFEs in the examples above).

The central control plane 1810 also receives information from the host machines 1820 in some embodiments. Each host machine, as shown, includes a local controller 1815 that manages a MFE 1830, as well as one or more data compute nodes (e.g., VMs) that communicate through the MFEs. In some embodiments, the local controllers are integrated into the virtualization software of the host machines 1820 along with the MFEs 1830. The local controllers receive configuration data from the management plane 1805 and/or central control plane 1810, and use this data to configure their respective MFE 1830. In some embodiments, the local controller receive this data via a specific protocol used by the central control plane, such as netcpa, and convert this data into configuration data readable by the MFE 1830. For instance, when the MFE is a flow-based MFE, the local controller 1815 receives abstract data tuples describing a configuration and converts these data tuples into flow entries used to configure the MFE. When the MFE is a code-based MFE such as ESX, the local controller 1815 receives the abstract data tuples and converts them into the appropriate type of table entries for the MFE, then distributes these table entries to the appropriate portion of the MFE (e.g., by installing each row in the appropriate table), such as the virtual switch, VTEP, I/O chain, uplink, etc.

In addition, the local controllers 1815 report various data about their respective MFEs to the central control plane 1810. This may include information about failed ports or other runtime data. In addition, when a new data compute node is installed on a host machine 1820, the data compute node is connected to the MFE 1830 on the host, and the local controller reports this data, including the address and other information for the data compute node (such as the logical network to which the data compute node belongs). As shown, the local controllers send data compute node locations 1840 to the central control plane, which identify the bindings between the data compute nodes and the MFEs. In some embodiments, the local controllers 1815 also report the VTEP group label for the MFE with this data, so that the central control plane stores a table 1845 with bindings between data compute node addresses and VTEP groups. Each row in such a table may include the address and the VTEP group identifier, though some embodiments also include a logical network identifier (allowing for different logical networks to re-use addresses without confusion).

A network topology assessor 1850 or other module in the central control plane uses the data received from the management plane 1850 as well as from the local controllers 1815 to provide data to the local controllers 1815 for their MFEs 1830. The network topology assessor 1850 uses the address:group bindings to determine which logical network information to send to each local controller. That is, if a particular MFE 1830 has a data compute node belonging to a particular logical network bound to it, then the central control plane will send the logical network configuration data 1855 for the particular logical network to the local controller 1815 that manages the particular MFE. The central control plane 1810 also sends the requisite group:VTEP bindings and data compute node address:group bindings 1860 to the local controllers 1815. If a data compute node is present on a host machine 1820, then the MFE 1830 on that host machine will need to receive the address:group bindings for all data compute nodes that attach to the same logical network as the data compute node. In addition, the MFE 1830 also needs to receive the group:VTEP list bindings for each group (i.e., each MFE) at which the other data compute nodes of the logical network are located, so that the MFE can send packets through the overlay network to any of these MFEs if necessary.

Figure 19:
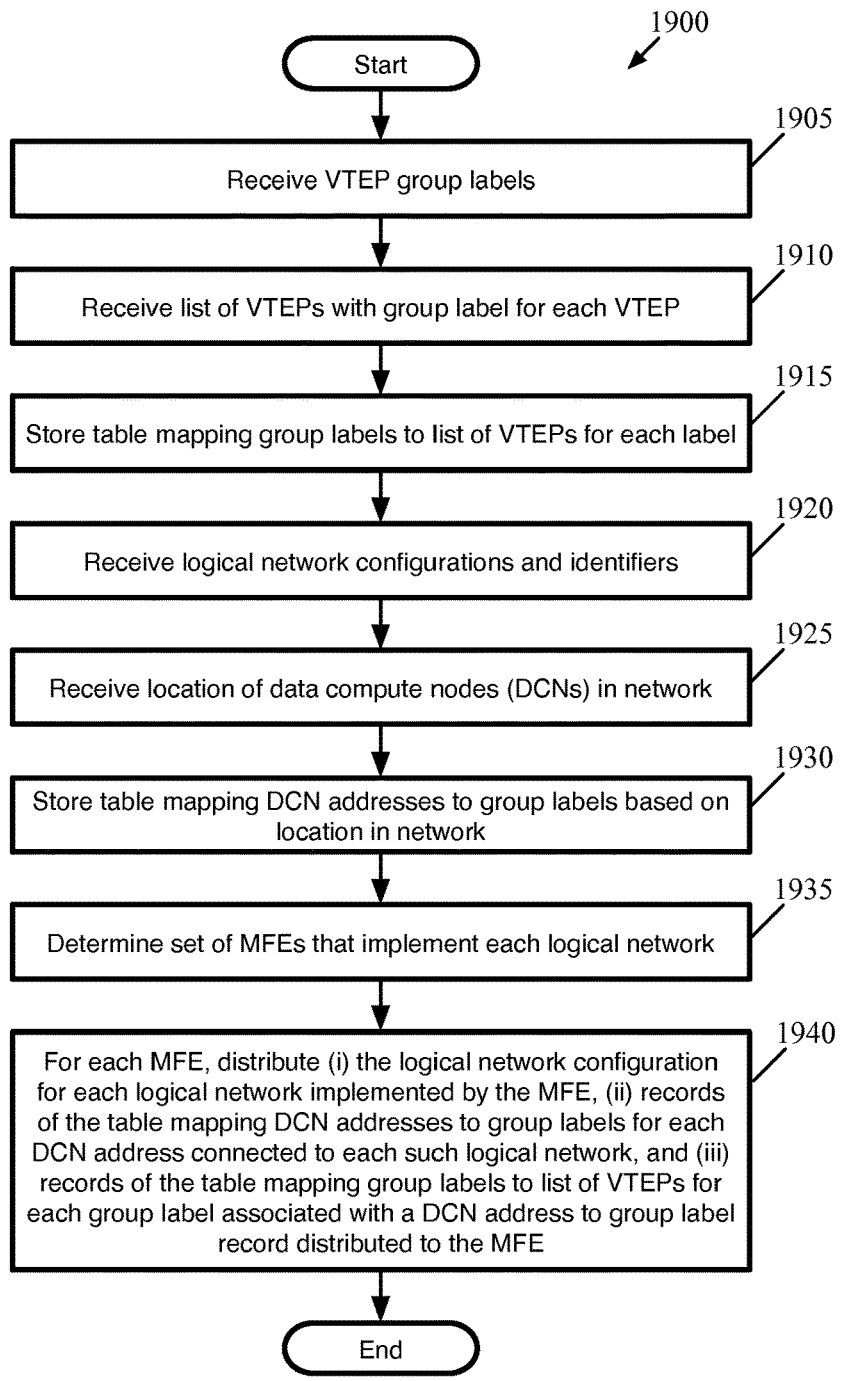
FIG. 19 conceptually illustrates a process performed by the central control plane of some embodiments to gather and distribute data regarding the mapping of tunnel endpoints to data compute node addresses to managed forwarding elements.

FIG. 19 conceptually illustrates a process 1900 performed by the central control plane of some embodiments to gather and distribute data regarding the mapping of tunnel endpoints to data compute node addresses to managed forwarding elements. Though the process 1900 is shown as a linear process, it should be understood that in some embodiments the central control plane will regularly receive updates and distribute updated information to the MFEs, rather than simply receiving all data at one time and only distributing that data once to the MFEs. In addition, in some cases, a first central controller receives logical network configuration data and/or tunnel endpoint information from the management plane and shares this with the other central controllers in the cluster, while a second network controller in the cluster distributes the data for the MFEs to the local controllers.

As shown, the process 1900 begins (at 1905) by receiving VTEP group labels. The process also receives (at 1910) a list of VTEPs with the group label for each VTEP. In some embodiments, this information is received as a single set of data (e.g., in a single transaction) from the management plane. For instance, some embodiments do not separately provide the central control plane with a list of group labels, but instead just provides the control plane with a list of VTEPs and the group labels assigned to them. For each VTEP, the group data may include both a MFE label as well as a cluster label. For example, if the VTEP is on a MFE that is involved in a bridge cluster and also acts as a first-hop MFE for data compute nodes on its host, then the VTEP will need both types of labels, as packets sent to the data compute node will need to go to that specific MFE but packets sent to the remote bridged network can be sent to any MFE in the bridge cluster.

While some embodiments receive this VTEP data from the management plane, as shown in FIG. 18, in other embodiments the central controller receives VTEP information from the local controllers each time a VTEP is created/configured on a host. That is, when the management plane creates a new VTEP on a particular MFE, the local controller for the MFE detects this information and sends messages to the central controller notifying the central controller of this new VTEP. These messages also provide the MFE label and/or cluster label as well.

Having received the VTEP group information, the process stores (at 1915) a table mapping group labels to a list of VTEPs for each label. In some embodiments, this table includes a row for each label, with a list of VTEPs associated with the label. The central controller generates this table based on the received information specifying a label for each VTEP, by determining all of the VTEPs for each label. In some embodiments, VTEPs may be listed in multiple rows, if they belong to both a group of VTEPs for a specific MFE and a group of VTEPs for a bridge cluster that spans multiple MFEs.

The process also receives (at 1920) logical network configurations and identifiers for the logical networks. As explained above, the management plane receives configurations for logical networks from administrators through an API in some embodiments, and translates this into tabular data describing the logical networks for the central control plane. In some embodiments, the management plane also assigns logical forwarding element and logical port identifiers (e.g., UUIDs) for each logical switch, logical router, logical switch port, logical router port, etc., and provides this information as part of the configuration. The logical network configuration also includes a list of addresses (e.g., MAC addresses) for data compute nodes that attach to each logical switch in a logical network, and in some embodiments specifies the type of data compute node (e.g., VM, container, physical server, etc.). This logical network information may be received at different times for different logical networks, as administrators may create new networks, remove networks, or modify the configuration (e.g., by adding or removing data compute nodes from the network).

The process 1900 also receives (at 1925) the location of data compute nodes in the network. This information, in some embodiments, is received from the local controllers whenever a data compute node is assigned to a new location (e.g., a new host machine). In some embodiments, a separate compute management system is responsible for creating the new data compute node on the host. When a new virtual interface is created on the MFE for the connection to the new data compute node, the local controller of some embodiments for that MFE detects the new interface (e.g., new virtual port) and reports the port information to the central controller. This port information specifies the MAC address as well as other information, such as the associated logical network for the new data compute node. As with the other data, the receipt of this information will not occur in a single transaction, as different data compute nodes will be created at different times, and the local controllers will report these events as they detect the new interfaces.

Next, the process 1900 stores (at 1930) a table mapping data compute node addresses to group labels based on the location in the network of the data compute nodes. That is, when a local controller reports the presence of a new data compute node at its MFE, the controller stores a new row in its table for the data compute node. This row specifies the MFE group label for the data compute node, as well as the logical network or logical switch identifier for the data compute node in some embodiments.

Using the logical network configuration data as well as the mapping of data compute nodes to locations, the process determines (at 1935) the set of MFEs that implement each logical network (or, inversely, the set of logical networks implemented by each MFE). For each data compute node connected to a particular MFE, the central controller determines the logical network of the data compute nodes and determines that the particular MFE should receive the configuration information for that logical network. In some embodiments, if a data compute node is logically connected to a first logical switch, then the MFE will need to receive the configuration data for that logical switch as well as other logical forwarding elements of the logical network (e.g., a logical router to which the logical switch connects, other logical switches connected to that logical router, other logical routers connected to that logical router as well as their connected logical switches, etc.).

For each MFE, the process 1900 then distributes (at 1940) (i) the logical network (or logical forwarding element) configuration for each logical network implemented by the MFE, (ii) records of the table mapping data compute node addresses to group labels for each data compute node address connected to any logical switch in any of the logical networks distributed to the MFE (e.g., any logical switch the configuration for which is distributed to the MFE), and (iii) records of the table mapping group labels to lists of VTEPs for each group label associated with a data compute node address to group label record distributed to the MFE. This is the information that allows the local controller to configure the MFE to implement the logical networks and send logical network packets through tunnels to the appropriate VTEPs. That is, each data compute node on a MFE belongs to a logical network. Based on that logical network association, the MFE determines the logical network (logical forwarding element) data needed by the MFE. This logical network has other data compute nodes attached, so the MFE needs the information to reach these other data compute nodes in case its local data compute node sends packets to those other data compute nodes. This information includes both the locations (VTEP group labels) of those other data compute nodes as well as the list of VTEPs for each such location.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 20 conceptually illustrates an electronic system 2000 with which some embodiments of the invention are implemented. The electronic system 2000 can be used to execute any of the control, virtualization, or operating system applications described above. The electronic system 2000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieve instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieve instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"). The output devices 2045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 9, 10, 14, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller, a method comprising:
    identifying a particular data compute node (DCN) for execution on a host machine along with a particular managed forwarding element (MFE) having a plurality of tunnel endpoints for establishing tunnels with other MFEs on other host computers to establish a particular logical network;
    to the particular MFE, distributing (i) one tunnel endpoint group identifier that is associated with a group of at least two tunnel endpoints that are candidate tunnel endpoints for use for the particular DCN and (ii) a group definition that includes at least two tunnel endpoint identifiers that identify the tunnel endpoints in the tunnel endpoint group,
    wherein the particular MFE uses the group identifier to identify the definition from which it selects one of the tunnel endpoint identifiers, and then uses the tunnel endpoint associated with the selected tunnel endpoint identifier to send encapsulated packets from the particular DCN to other MFEs.

2. The method of claim 1, wherein identifying the particular DCN comprises receiving a message, from a local controller, that the particular DCN has attached to the particular MFE, wherein the local controller manages the particular MFE.

3. The method of claim 2, wherein the local controller and particular MFE operate in virtualization software of a host machine, wherein the particular DCN is hosted on the host machine.

4. The method of claim 1 further comprising receiving a logical network configuration and identifying other DCNs for the particular logical network using the received logical network configuration.

5. The method of claim 1 further comprising storing in a first table a plurality of mappings identifying a group tunnel identifier for each of a plurality of DCNs and in a second table a group definition for each group tunnel identifier that includes at least two tunnel endpoint identifiers that identify at least two tunnel endpoints in a tunnel endpoint group identified by the group tunnel identifier.

6. The method of claim 5, wherein the plurality of mappings comprises DCNs belonging to a plurality of logical networks.

7. The method of claim 5, wherein a first DCN belonging to a first logical network and a second DCN belonging to a second logical network map to a same tunnel endpoint group identifier.

8. The method of claim 7, wherein the first and second DCNs operate on a same host machine.

9. The method of claim 1, wherein distributing the tunnel endpoint group identifier and group definition to the particular MFE comprises distributing the tunnel endpoint group identifier and group definition to a local controller that manages the particular MFE.

10. The method of claim 9, wherein the local controller translates the received tunnel endpoint group identifier and group definition into configuration data readable by the particular MFE.

11. The method of claim 9 further comprising distributing configuration data for the particular logical network to the local controller.

12. A non-transitory machine readable medium storing a network controller application for execution by at least one processing unit, the network controller application comprising sets of instructions for:
- identifying a first data compute node (DCN) for execution on a first host machine along with a first managed forwarding element (MFE) having a plurality of tunnel endpoints for establishing tunnels with other MFEs on other host computers to establish a particular logical network;
- distributing, to the first MFE, a plurality of mappings that identify a group tunnel identifier for each of a plurality of other DCNs that execute on other host machines and belong to the particular logical network;
- distributing, to the first MFE, a group definition for each group tunnel identifier that includes at least two tunnel endpoint identifiers that identify at least two tunnel endpoints in a tunnel endpoint group identified by the group tunnel identifier;
- wherein after using one of the mappings to identify a group tunnel identifier for a packet from the first DCN to a second DCN executing on a second host machine, the first MFE selects a tunnel endpoint identifier from the identified group identifier's definition, and then uses the tunnel endpoint identified by the selected tunnel endpoint identifier to send an encapsulated packet from the particular DCN to a second MFE executing on the second host machine on which the second DCN also executes.

13. The non-transitory machine readable medium of claim 12, wherein the set of instructions for identifying the first DCN comprises a set of instructions for receiving a message, from a local controller, that the first DCN has attached to the first MFE, wherein the local controller manages the first MFE.

14. The non-transitory machine readable medium of claim 12, wherein the network controller application further comprises a set of instructions for receiving a logical network configuration and identifying the other DCNs of the particular logical network using the received logical network configuration.

15. The non-transitory machine readable medium of claim 12, wherein the network controller application further comprises a set of instructions for storing in a first table a plurality of mappings identifying a group tunnel identifier for each of a plurality of DCNs and in a second table a group definition for each group tunnel identifier that includes at least two tunnel endpoint identifiers that identify at least two tunnel endpoints in a tunnel endpoint group identified by the group tunnel identifier.

16. The non-transitory machine readable medium of claim 15, wherein the first plurality of mappings comprises DCNs belonging to a plurality of logical networks.

17. The non-transitory machine readable medium of claim 15, wherein a first DCN belonging to a first logical network and a second DCN belonging to a second logical network map to a same tunnel endpoint group identifier, wherein the first and second DCNs operate on a same host machine.

18. The non-transitory machine readable medium of claim 12, wherein the set of instructions for distributing the mappings and group definitions to the first MFE comprises a set of instructions distributing the mappings and group definitions to a local controller that manages the first MFE.

19. The non-transitory machine readable medium of claim 18, wherein the local controller translates the received mappings and group definitions into configuration data readable by the first MFE.

20. The non-transitory machine readable medium of claim 18, wherein the network controller application further comprises a set of instructions for distributing configuration data for the particular logical network to the local controller.

* * * * *